US008411960B2

(12) United States Patent
Misawa et al.

(10) Patent No.: US 8,411,960 B2
(45) Date of Patent: Apr. 2, 2013

(54) IMAGE PROCESSING FOR GENERATING ELECTRONIC DOCUMENT DATA IN WHICH AN OBJECT CAN BE SEARCHED FROM AN INPUT IMAGE

(75) Inventors: Reiji Misawa, Tokyo (JP); Ryo Kosaka, Tokyo (JP); Tomotoshi Kanatsu, Tokyo (JP); Hidetomo Sohma, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 495 days.

(21) Appl. No.: 12/713,025

(22) Filed: Feb. 25, 2010

(65) Prior Publication Data
US 2010/0220929 A1 Sep. 2, 2010

(30) Foreign Application Priority Data

Feb. 27, 2009 (JP) ................................. 2009-046214

(51) Int. Cl.
*G06K 9/46* (2006.01)
*G06K 9/00* (2006.01)
(52) U.S. Cl. ........................................................ 382/190
(58) Field of Classification Search .................. 382/173, 382/177, 190; 707/4, 10, 736, 769, 791, 707/E17.014, E17.044; 348/738, E5.123
See application file for complete search history.

(56) References Cited

U.S. PATENT DOCUMENTS

| 6,178,434 B1 | 1/2001 | Saitoh | |
|---|---|---|---|
| 6,775,665 B1 * | 8/2004 | Piersol | ................................... 1/1 |
| 7,603,357 B1 * | 10/2009 | Gourdol et al. | ......................... 1/1 |
| 8,200,700 B2 * | 6/2012 | Moore et al. | ................... 707/791 |
| 2010/0220929 A1 * | 9/2010 | Misawa et al. | ................. 382/190 |
| 2011/0102684 A1 * | 5/2011 | Sugiyama et al. | ............ 348/738 |
| 2011/0167081 A1 * | 7/2011 | Kosaka et al. | ................. 707/769 |

FOREIGN PATENT DOCUMENTS

| CN | 1662933 A | 8/2005 |
|---|---|---|
| CN | 1851713 A | 10/2006 |
| JP | 10-228473 A | 8/1998 |
| JP | 2005-108230 A | 4/2005 |
| JP | 2005-227862 A | 8/2005 |
| JP | 2009-009526 A | 1/2009 |
| WO | 2009005021 A1 | 1/2009 |

* cited by examiner

*Primary Examiner* — Amir Alavi
(74) *Attorney, Agent, or Firm* — Canon U.S.A., Inc., IP Division

(57) ABSTRACT

An image processing apparatus extracts an object area (e.g., character, picture, line drawing, and table) from an input image and acquires a metadata to be associated with the object. The image processing apparatus generates a transparent graphics description for an object area having an attribute that requires generation of the transparent graphics description, and generates an electronic document while associating the transparent graphics description with the metadata. As transparent graphics description, an arbitrary shape of graphics can be used. Accordingly, the image processing apparatus can generate electronic document data suitable for a highlight expression, which is easy for users to recognize in a search operation using a keyword to search an object included in an electronic document.

17 Claims, 24 Drawing Sheets

FIG.7

| | ATTRIBUTE | AREA ACCOMPANIED BY CAPTION | COORDINATE X | COORDINATE Y | WIDTH W | HEIGHT H | PAGE | CHARACTER INFORMATION |
|---|---|---|---|---|---|---|---|---|
| 601 | HEADING | — | X1 | Y1 | W1 | H1 | 1 | SAMPLE |
| 602 | TABLE | — | X2 | Y2 | W2 | H2 | 1 | — |
| 603 | PICTURE | — | X3 | Y3 | W3 | H3 | 1 | — |
| 604 | CAPTION | 603 | X4 | Y4 | W4 | H4 | 1 | FIG. 1 |
| 605 | BODY | — | X5 | Y5 | W5 | H5 | 1 | ..FIG. 1 IS AAA... |

FIG.8A

| ATTRIBUTE | CHARACTER | PICTURE | LINE DRAWING | TABLE |
|---|---|---|---|---|
| CONVERSION PROCESSING | VECTOR CONVERSION | IMAGE SEGMENTATION | VECTOR CONVERSION | VECTOR CONVERSION (TABLE FRAME PORTION) |
| DELETION PROCESSING | ○ | ○ | ○ | ○ |

FIG.8B

| ATTRIBUTE | CHARACTER | PICTURE | LINE DRAWING | TABLE |
|---|---|---|---|---|
| CONVERSION PROCESSING | IMAGE SEGMENTATION (BINARY) | × | | |
| DELETION PROCESSING | ○ | × | | |

FIG.8C

| ATTRIBUTE | CHARACTER | PICTURE | LINE DRAWING | TABLE |
|---|---|---|---|---|
| CONVERSION PROCESSING | IMAGE SEGMENTATION (BINARY) | GENERATE FRAME DRAWING PATH (TRANSPARENT) FOR CAPTION IDENTIFIER ATTACHED AREA AND DO NOTHING FOR OTHER AREA | | |
| DELETION PROCESSING | ○ | × | | |

FIG.8D

| ATTRIBUTE | CHARACTER | PICTURE | LINE DRAWING | TABLE |
|---|---|---|---|---|
| CONVERSION PROCESSING | IMAGE SEGMENTATION (BINARY) | IMAGE SEGMENTATION | VECTOR CONVERSION + GENERATE FRAME DRAWING PATH (TRANSPARENT) FOR CAPTION IDENTIFIER ATTACHED AREA | |
| DELETION PROCESSING | ○ | | | |

FIG.10

| | ATTRIBUTE | AREA ACCOMPANIED BY CAPTION | COORDINATE X | COORDINATE Y | WIDTH W | HEIGHT H | PAGE | CHARACTER INFORMATION |
|---|---|---|---|---|---|---|---|---|
| 905 | PICTURE | — | X1 | Y1 | W1 | H1 | 1 | — |
| 906 | CAPTION | 905 | X2 | Y2 | W2 | H2 | 1 | FIG. 1 |
| 907 | BODY | — | X3 | Y3 | W3 | H3 | 2 | ...... |
| 908 | BODY | — | X4 | Y4 | W4 | H4 | 3 | ...... |
| 909 | BODY | — | X5 | Y5 | W5 | H5 | 4 | .. FIG. 1 IS AAA... |

FIG.11

```
<?xml version="1.0"?>
<svg xmlns="http://www.w3org/2000/svg" width="2480" height="3520"
     xmns:x="http://@@@.jp">

<text x="X1" y="Y1" color="#000000">HEADING</text>

<g>
   <path stroke="#000000" d="M X4,Y4 L···"/>
  </g>

<g x:caption_id="1">  ~1107
    <image x="X2" y="Y2" width="W2" height="H2"
        xlink:href="data:image/png;base64,Dez3632fsod6Xhd0dsc4d ......."/>
  </g>

<text x="X4" y="Y4" color="#000000">FIG. 1</text>

<text x="X5" y="Y5" color="#000000">···FIG. 1 IS AAA.···</text>

<desc>
   <metadata>
     <x:meta id="1" str="AAA"/>
   </metadata>
   </desc>   1108  1109

</svg>
```

1101: text HEADING line
1102: g/path
1103: g with image (caption_id 1107)
1104: FIG. 1 text
1105: FIG. 1 IS AAA text
1106: desc/metadata block (1108, 1109)
1100: outer block

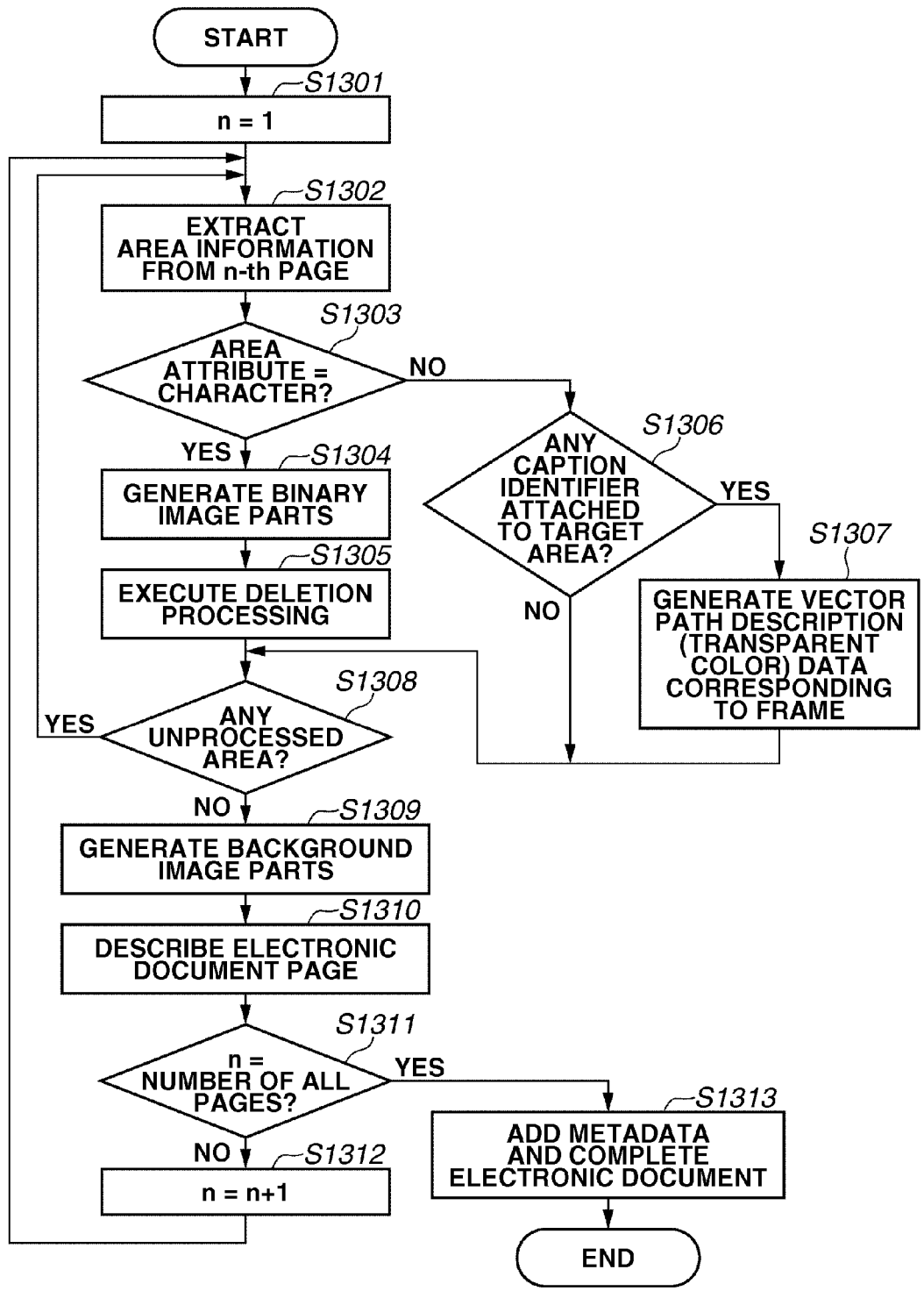

FIG.15
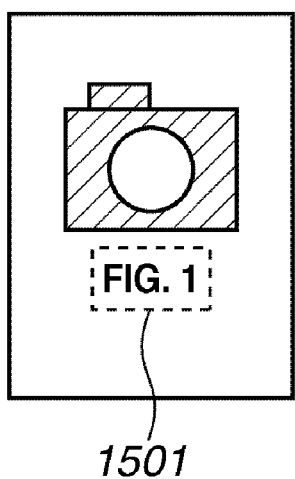
1501
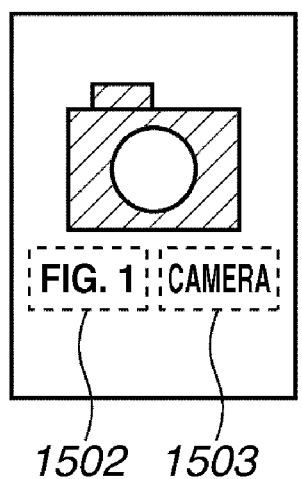
1502 1503
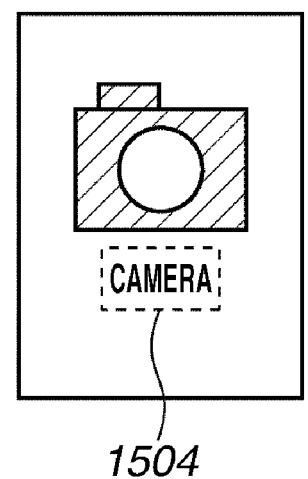
1504

FIG.16
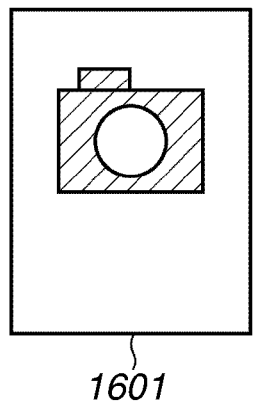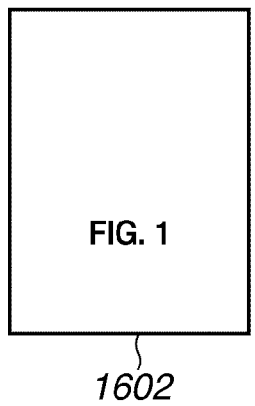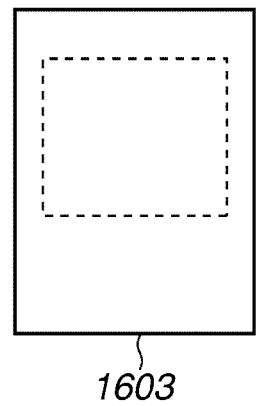
1601　　　1602　　　1603

FIG.17

```
<?xml version="1.0"?>                                                    ⎬ 1700
<svg xmlns="http://www.w3org/2000/svg" width="2480" height="3520"
    xmns:x="http://@@@.jp">

<image x="0" y="0" width="2480" height="3520"                          ⎫
      xlink:href="data:image/jpeg;base64,/9j/2wceAB8Vxsace93hd ......."/> ⎬ 1701
                                                                         ⎭
  <image x="780" y="608" width="694" height="208"                        ⎫
      xlink:href="data:image/png;base64,Dez3632fsod6Xhd0dsc4d ......."/> ⎬ 1702
                     ⌢1704                                               ⎭
  <g x:caption_id="1">                                                   ⎫
    <path fill="none" stroke="transparent"
        d="M440,608 L2040,608 L2040,1880 L440,1880 L440,608 s"/>         ⎬ 1703
  </g>                                                                   ⎭
</svg>
```

FIG.18

```
<?xml version="1.0"?>                                            ⎫
<svg xmlns="http://www.w3org/2000/svg" width="2480" height="3520" ⎬ 1800
    xmns:x="http://@@@.jp">                                       ⎭

<pageSet>
                                                            ⎫
       <image x="0" y="0" width"2480" height="3520"               │
          xlink:href="data:image/jpeg;base64,/9j/2wceAB8Vxsace93hd ......."/>
                                                                  │
       <image x="780" y="608" width="694" height="208"            │
          xlink:href="data:image/png;base64,Dez3632fsod6Xhd0dsc4d ......."/>
                                                                  ⎬ 1801
1808─  <g x:caption_id="1">                              ⎫        │
          <path fill="none" stroke="transparent"         ⎬ 1809   │
             d="M440,608 L2040,608 L2040,1880 L440,1880 L440,608 s"/>
       </g>                                              ⎭        │
                                                           ⎭

⎫
       <image x="0" y="0" width"2480" height="3520"               │
          xlink:href="data:image/jpeg;base64,/9j/2wceAB8Vxsace93hd ......."/>
                                                                  ⎬ 1802
       <image x="160" y="380" width="2230" height="2580"          │
          xlink:href="data:image/png;base64,;5ponsfdfGJHGREZZC ......."/>
                                                           ⎭

⎫
       <image x="0" y="0" width"2480" height="3520"               │
          xlink:href="data:image/jpeg;base64,/9j/2wceAB8Vxsace93hd ......."/>
                                                                  ⎬ 1803
       <image x="160" y="380" width="2230" height="2580"          │
          xlink:href="data:image/png;base64,c24wdbsr7cadffdhjhfhl 3d ......."/>
                                                           ⎭

⎫
       <image x="0" y="0" width"2480" height="3520"               │
          xlink:href="data:image/jpeg;base64,/9j/2wceAB8Vxsace93hd ......."/>
                                                                  ⎬ 1804
       <image x="160" y="380" width="2230" height="2580"          │
          xlink:href="data:image/png;base64,2da23edDS2edSedsdasd ......."/>
                                                           ⎭

</pageSet>

<desc>                                                          ⎫
    <metadata>                                                    │
       <x:meta id="1" str="AAA"/>                                 ⎬ 1805
    </metadata>                                                   │
  </desc>    1807  1806                                           ⎭

</svg>
```

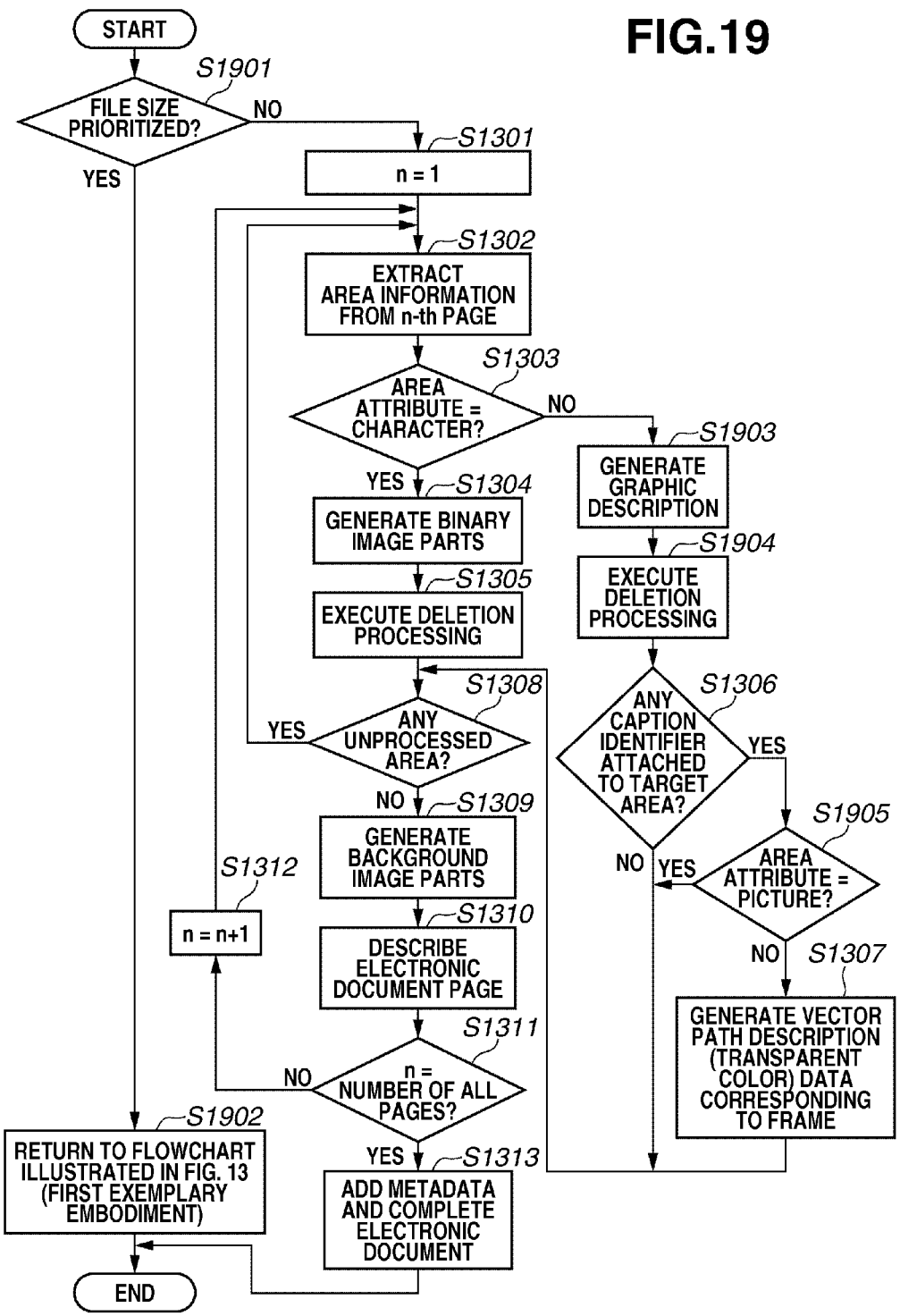

IMAGE PROCESSING FOR GENERATING ELECTRONIC DOCUMENT DATA IN WHICH AN OBJECT CAN BE SEARCHED FROM AN INPUT IMAGE

BACKGROUND OF THE INVENTION

1. Field of the Invention

The present invention relates to an image processing apparatus, an image processing method, and a computer program that can generate electronic document data in which an object can be searched from a document image.

2. Description of the Related Art

Conventionally, it is desired to construct an image processing system that can search objects other than characters, such as pictures, graphics, line drawings, and tables, in a document image so that these objects can be easily used. The objects described in the following description are objects other than characters unless they are specifically mentioned.

For example, the image processing system extracts an object from the document image and determines whether a caption character string (i.e., a character string that explains the object) is present in the vicinity of the object. If it is determined that the caption character string is present, the image processing system designates the caption character string as a metadata associated with the object, so that the object can be searched based on the metadata.

Then, each object associated with the metadata is JPEG compressed and stored as a single electronic document. When an application uses the above-described electronic document, the application can perform the search using the metadata as a keyword to find an object.

Further, in a case where a caption that is adjacent to an object is a drawing number (e.g., "FIG. 1"), a general document image includes a body in which a character string that represents the same drawing number is described to explain the object. More specifically, an expression that is identical to the drawing number described in the caption can be found in the body.

As discussed in Japanese Patent Application Laid-Open No. 10-228473, there is a conventional technique capable of forming a hypertext by automatically generating a link between a drawing number in the caption and a drawing number in the body. For example, in a case where the caption that is adjacent to an object includes a drawing number "FIG. 1" and the body includes a sentence "FIG. 1 is AAA.", a hyperlink can be generated between the "FIG. 1" in the caption and the "FIG. 1" in the body. Further, the technique discussed in the above-described prior art can form a hypertext by automatically generating a link between an object and a related body.

On the other hand, a multifunction peripheral (MFP) has the capability of generating an electronic document by performing image processing and format conversion processing on a scanned input document image and has a transmission function for transmitting the generated electronic document to a personal computer (PC) via a network.

The image processing includes processing for acquiring a character code by performing character recognition processing on a character image contained in a document image. The image processing further includes vectorization processing for converting graphics in the document image into vector data. In the format conversion processing, the data having been subjected to the above-described image processing is converted into a predetermined electronic document format (e.g., portable document format (PDF)) to generate an electronic document file.

As discussed in Japanese Patent Application Laid-Open No. 2009-009526, there is a conventional technique for embedding a character recognition result as a transparent text (i.e., a character code in an invisible state drawn by designating a transparent color as a drawing color) into an image file and converting the data into an electronic document format (e.g., PDF or XPS). When the electronic document file having been generated in this manner is displayed, a transparent text is drawn in a character portion of the document image.

In this case, if a user performs a keyword search, the system searches a transparent text. However, the user cannot visually recognize the transparent text itself. Therefore, the user feels as if a target character image portion in the document image has been searched. In this manner, the character image portion that corresponds to the keyword to be searched can be displayed in a highlighted state. Therefore, the user can efficiently identify the target character image portion.

On the other hand, in a case where a caption character string is added as a metadata to an object other than characters so that the object can be searched in an electronic document, it is desired to highlight a search result (i.e., a target object) having been hit in the keyword search.

However, the target object to be searched in this case is any one of picture, graphics, and table objects, which are greatly different in color and shape. Therefore, the highlight display may not bring an expected effect. Users are unable to identify a target object having been hit in the search.

For example, in a case where the contour of a searched object is highlighted with a red color, the highlight display for a search result cannot be effective if the searched object is a picture object including a red color portion in the vicinity of the searched object or in most of the entire area. More specifically, it becomes very difficult for users to identify the object having been hit in the search.

Further, in a case where a generated electronic document data is transmitted via a network, it is desired to reduce the data size of the electronic document data. However, if respective objects (e.g., pictures) extracted from a document image are independently compressed and the compressed image data are integrated with background image data and stored as a single electronic file, the size of the obtained file tends to become larger compared to the size of a file obtained by compressing a piece of original document image.

More specifically, in a case where a document image containing a picture is transmitted, the total data size of the transmitted image can be efficiently reduced by compressing the entire image including a picture portion and the background as an integrated compression image data rather than storing the extracted picture object and the background as independent compression image data.

In general, elements that constitute the above-described data are image information and compression header information. If the number of object data is increased, the header information is repetitively stored for respective data. Especially, the header information required in the compression tends to become larger in a highly-advanced image compression method.

Accordingly, in a case where an electronic document file is generated based on a document image that includes numerous objects (e.g., pictures), it is desired to compress all objects as a single image rather than separately compressing respective objects to efficiently reduce the total size of data.

For example, in a case where image data is stored as a JPEG compressed stream, each stream is accompanied with header information of 700 bytes or more, which includes a quantization table and Huffman codes to be used for rasterization. In a case where an image of one page includes 100 pictures, the size reduction effect comparable to 70 K bytes or more per one page can be obtained by compressing all of the pictures and the background as an integrated image data, compared to a case where the background and the pictures are respectively compressed as a total of 101 independent image data.

However, if the objects and the background are compressed as an integrated image data, electronic document data is stored in a state where a search target object is merged with the background. Therefore, it is difficult to identify and highlight a target object in the search.

SUMMARY OF THE INVENTION

According to an aspect of the present invention, an image processing apparatus includes an area dividing unit configured to extract an object area from an input image, a determination unit configured to determine an attribute of the object area extracted by the area dividing unit, a metadata processing unit configured to acquire a metadata to be associated with the object area extracted by the area dividing unit, a graphics description generating unit configured to generate a transparent graphics description for an object area having an attribute that requires generation of the transparent graphics description, and an electronic document generation unit configured to associate the transparent graphics description generated by the graphics description generating unit with the metadata and generate an electronic document that includes image data generated based on the input image and the transparent graphics description associated with the metadata.

The image processing apparatus according to the present invention can generate electronic document data suitable for a highlight expression, which is easy for users to recognize in a search operation using a keyword to search an object other than characters included in an electronic document, without depending on the shape and the color of a search target object or without depending on an image compression state.

Further features and aspects of the present invention will become apparent from the following detailed description of embodiments with reference to the attached drawings.

BRIEF DESCRIPTION OF THE DRAWINGS

The accompanying drawings, which are incorporated in and constitute a part of the specification, illustrate embodiments, features, and aspects of the invention and, together with the description, serve to explain the principles of the invention.

FIG. 7 illustrates an example of information stored in a storage unit 211.

FIGS. 8A to 8D are examples of a correspondence table (i.e., control information) of the format converting unit 305 illustrated in FIG. 3.

FIG. 10 illustrates an example of information extracted from the example image data illustrated in FIG. 9.

FIG. 11 illustrates an example of electronic document data generated according to an embodiment of the present invention.

FIG. 13 is a flowchart illustrating an example procedure of processing to be executed by the format converting unit 305 illustrated in FIG. 3.

FIG. 15 illustrates examples of anchor character strings and metadata character strings in a caption area.

FIG. 16 illustrates examples of graphics data to be generated when the first page of the image data illustrated in FIG. 9 is input.

FIG. 17 illustrates an example of page description according to an electronic document format.

FIG. 18 illustrates an example of output electronic document data.

FIG. 19 is a flowchart illustrating an example procedure of processing to be executed by the format converting unit 305 illustrated in FIG. 3 according to a second embodiment of the present invention.

DESCRIPTION OF THE EMBODIMENTS

Various embodiments, features, and aspects of the invention will be described in detail below with reference to the drawings.

Figure 1:
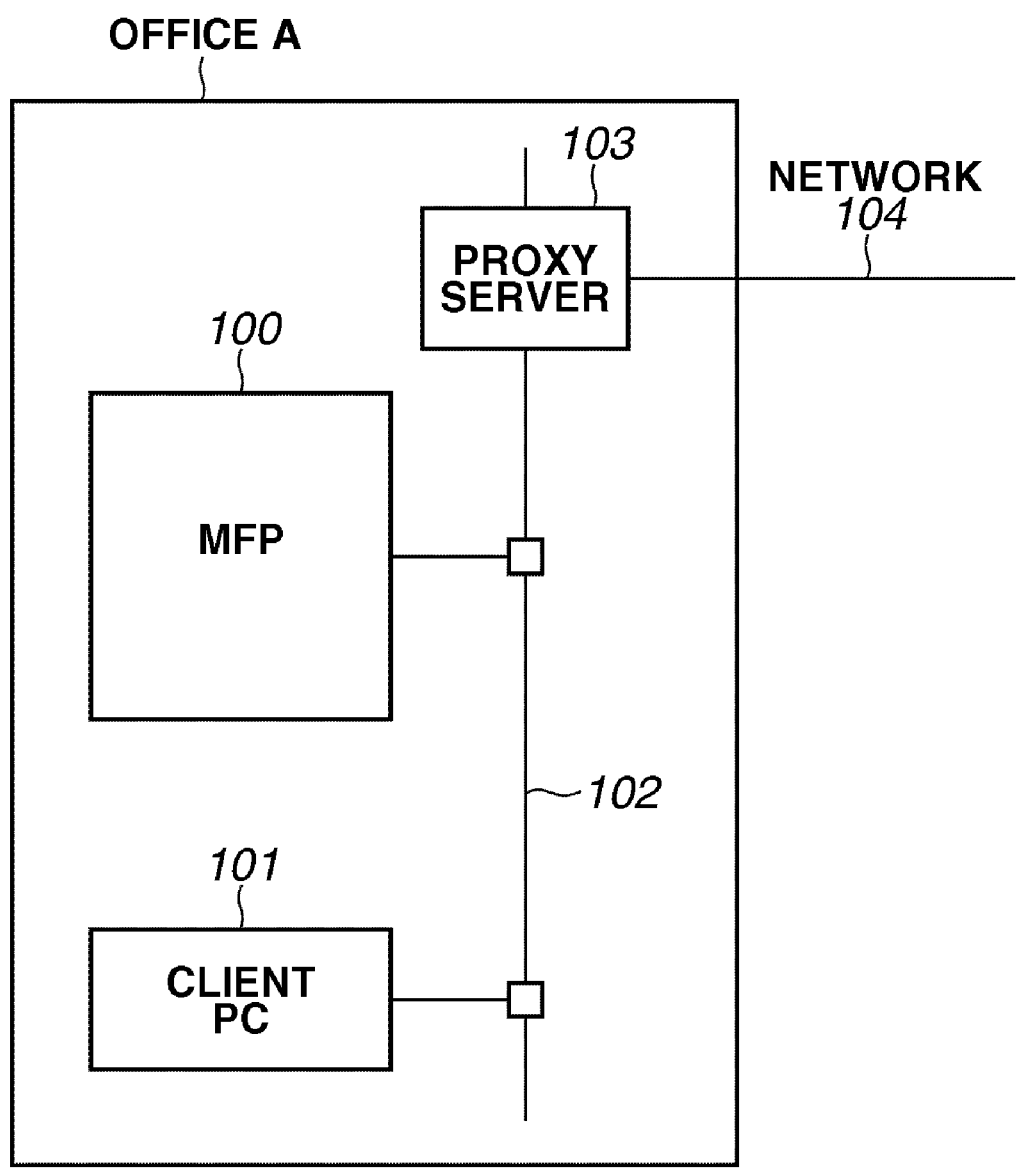
FIG. 1 is a block diagram illustrating an image processing system according to an embodiment of the present invention.

Hereinafter, a first embodiment of the present invention is described below with reference to the attached drawings. FIG. 1 is a block diagram illustrating a configuration of an image processing system according to an embodiment of the present invention.

In FIG. 1, a multi function peripheral (MFP) 100 is connected to a local area network (LAN) 102 installed in an office A. The MFP 100 is a multifunctional machine that can realize a plurality of functions (e.g., a copy function, a print function, and a transmission function). The LAN 102 is connected to an external network 104 via a proxy server 103.

A client PC 101 can receive transmission data from the MFP 100 via the LAN 102 and can use the functions of the MFP 100. For example, the client PC 101 transmits print data to the MFP 100 to cause the MFP 100 to generate a print product based on the received print data.

The configuration illustrated in FIG. 1 is a mere example. A plurality of offices, each having constituent components similar to those illustrated in FIG. 1, may be connected to each other via the network 104. The network 104 is a communication network that can be realized, for example, by the Internet, a local area network (LAN), a wide area network (WAN), a telephone circuit, a dedicated digital circuit, an ATM and Frame Relay circuit, a communication satellite circuit, a cable TV circuit, or a data broadcasting wireless circuit. The network 104 can be constituted by any other communication network capable of realizing data transmission and reception.

Each of the client PC 101 and the proxy server 103 includes fundamental constituent components (e.g., a central processing unit (CPU), a random access memory (RAM), a read only memory (ROM), a hard disk, an external storage device, a network interface, a display device, a keyboard, and a mouse), which are similar to those installed on a general computer.

Figure 2:
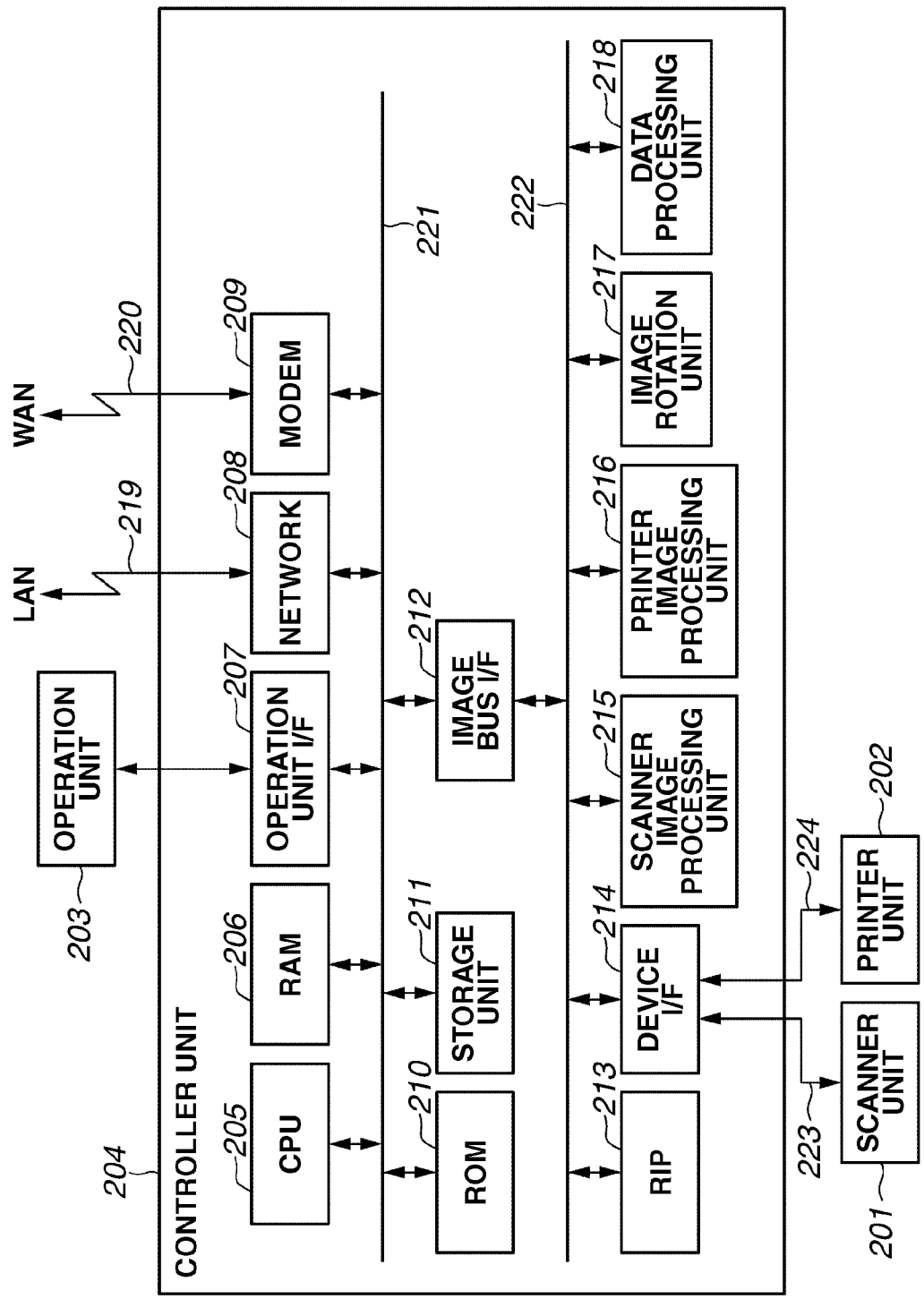
FIG. 2 is a block diagram illustrating a multifunction peripheral (MFP) 100 illustrated in FIG. 1.

FIG. 2 illustrates a detailed configuration of the MFP (i.e., an image processing apparatus) 100 according to the present embodiment. The MFP 100 includes a scanner unit 201 that can function as an image input device, a printer unit 202 that can function as an image output device, a control unit 204 that includes a central processing unit (CPU) 205, and an operation unit 203 that can function as a user interface.

The control unit 204 is a controller that can perform processing for inputting and outputting image information and device information through communications with the scanner unit 201, the printer unit 202, and the operation unit 203 as well as communications with external devices accessible via a local area network (LAN) 219 and a public line (WAN) 220. The public line (WAN) 220 may also be referred to as a general telephone circuit.

The CPU 205 can control various functional units provided in the control unit 204. A random access memory (RAM) 206 is a system work memory that functions as an image memory capable of temporarily storing image data when the CPU 205 performs various operations. A read only memory (ROM) 210 is a boot ROM, which can store a system boot program and other programs. A storage unit 211 is a hard disk drive, which can store system control software programs and image data.

An operation unit I/F 207 is an interface unit connected to the operation unit (UI) 203. The operation unit I/F 207 can output image data to the operation unit 203. The operation unit 203 displays the image data received from the operation unit I/F 207. Further, if a user inputs information to the image processing apparatus via the operation unit 203, the operation unit I/F 207 can transmit the input information to the CPU 205.

A network IF 208 connects the image processing apparatus to the LAN 219 to perform processing for inputting and outputting packet format information. A modem 209 connects the image processing apparatus to the public telephone circuit 220 to perform data demodulation and modulation processing for inputting and outputting information. The above-described devices are mutually connected via a system bus 221.

An image bus interface 212 is a bus bridge that connects the system bus 221 and an image bus 222. The image bus 222 can speedily transfer image data. The image bus interface 212 can convert a data structure. The image bus 222 is, for example, PCI bus or IEEE1394.

The following devices are mutually connected via the image bus 222. A raster image processor (RIP) 213 can realize rendering processing for analyzing a page description language (PDL) code and rasterizing the PDL code into a bitmap image having a designated resolution.

When the RIP 213 performs the above-described rasterization processing, attribute information is added based on a pixel-by-pixel basis or based on an area-by-area basis. This processing is generally referred to as image area determination processing. Through the image area determination processing, attribute information that represents an object type, such as character (text), line, graphics, or image, can be added to each pixel or each area.

For example, an image area signal is output from the RIP 213 according to an object type of the PDL description in the PDL code. Attribute information representing an attribute indicated by the signal value is stored in association with the pixel or the area corresponding to the object. Accordingly, image data is accompanied by attribute information associated with the image data.

A device I/F unit 214 connects the scanner unit 201 (i.e., image input device) to the control unit 204 via a signal line 223. Further, the device I/F unit 214 connects the printer unit 202 (i.e., the image output device) to the control unit 204 via a signal line 224. The device I/F unit 214 can perform synchronous/asynchronous conversion processing on image data.

A scanner image processing unit 215 can perform correction, modification, and editing processing on input image data. A printer image processing unit 216 can perform correction and resolution conversion processing on print output image data to be output to the printer unit 202 according to the printer unit 202. An image rotation unit 217 can rotate the input image data to output an upright image. The data processing unit 218 can perform the following processing.

Next, the data processing unit 218 is described in detail with reference to FIG. 3. The data processing unit 218 includes an area dividing unit (or an area extracting unit) 301, an attribute information adding unit 302, a character recognizing unit 303, a metadata processing unit 304, and a format converting unit 305. The data processing unit 218 causes respective processing units 301 to 305 to perform processing in response to image data 300 entered from a scanner unit by scanning an image. The data processing unit 218 outputs the processed data as electronic document data 310.

The area dividing unit 301 inputs image data scanned by the scanner unit 201 illustrated in FIG. 2 or image data (i.e., a document image) stored in the storage unit 211. The area dividing unit 301 can perform extraction and grouping processing on pixels of data to extract object areas (i.e., areas of objects, such as characters, pictures, graphics, and tables, which are disposed in a page).

In this case, the area dividing unit 301 can use an appropriate area extraction method (i.e., an area division method) that is conventionally known. According to an example method, the area dividing unit 301 binarizes an input image to generate a binary image and reduces the resolution of the binary image to generate a thinned image (i.e., a reduced image). For example, to generate a thinned image of 1/(M× N), the area dividing unit 301 divides the binary image into a plurality of groups each including M×N pixels. The area dividing unit 301 determines whether a black pixel is present in each group of M×N pixels. If it is determined that the target group includes the black pixel, the area dividing unit 301 sets a black pixel as a corresponding pixel of a reduced image to be generated as a thinned image to be generated. On the other hand, if it is determined that the target group does not include any black pixel, the area dividing unit 301 sets a white pixel as a thinned image to be generated.

Next, the area dividing unit 301 extracts connected black pixels (i.e., black connected components where the black pixels are continuously arrayed) from the thinned image and generates rectangles that circumscribes the connected black pixels. If rectangles (each corresponding to one character) having a size similar to that of a character portion in a document image are arrayed, or if the size of either the vertical side or the horizontal side of the extracted rectangles are similar to the character image size (i.e., the rectangle circumscribing some character images of which black pixels connect) and a similar rectangle is disposed at the short side thereof, it can be regarded as character images that constitutes one character row. In this case, the area dividing unit 301 obtains a rectangle that represents one character row by connecting the rectangles.

Then, an assembly of rectangles each having substantially the same length of the short side of the rectangle that represents one character row and arrayed at equal intervals in the column direction can be regarded as a body portion. Therefore, the area dividing unit 301 extracts a body area by connecting these rectangles. Further, the area dividing unit 301 can extract each of picture areas, graphic areas, and table areas, as a portion of continuously connected black pixels having a larger size compared to the character image.

Figure 6:
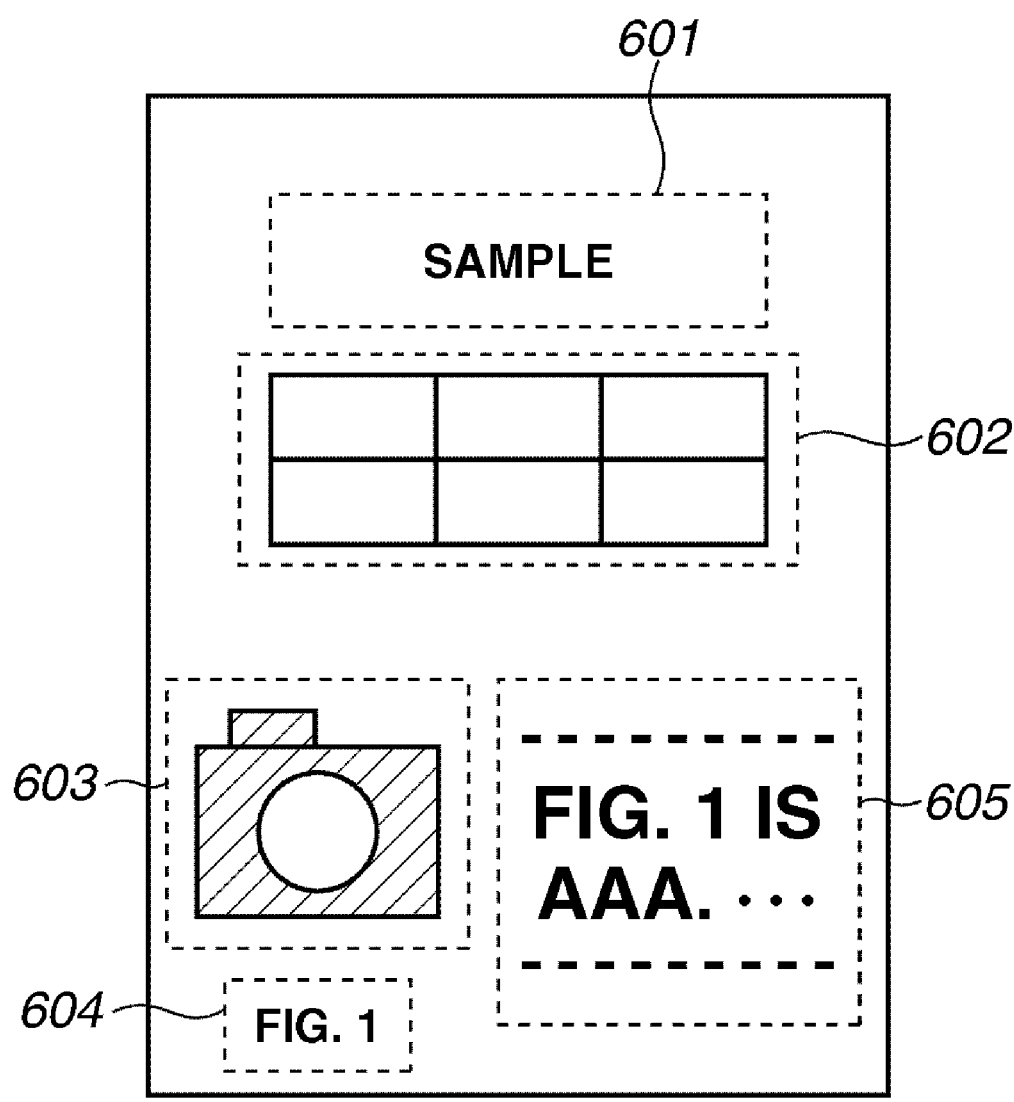
FIG. 6 illustrates an example of extracted areas.

As a result, for example, areas 601 to 605 illustrated in FIG. 6 can be extracted. The attribute of each area can be determined based on its size, aspect ratio, black pixel density, or a contour tracing result applied to white pixels existing inside the connected black pixels, as described below.

The attribute information adding unit 302 adds an attribute to each area divided by the area dividing unit 301. For example, to process the example image illustrated in FIG. 6 as input image data, the attribute information adding unit 302 performs the following processing. The area 605 has a plurality of rows of characters that constitute a paragraph in the page. Therefore, the attribute information adding unit 302 adds the attribute "body" to the area 605.

Then, the attribute information adding unit 302 determines whether the remaining area includes a rectangle that has a size similar to that of a character image. Especially, if an area includes character images, similar rectangles circumscribing individual character images periodically appear in the area. Therefore, the attribute information adding unit 302 can identify this area as an area that includes characters.

As a result, the attribute information adding unit 302 adds an attribute "character area" to each of the area 601 and the area 604 because it is determined that these areas include characters. In this case, each of the area 601 and the area 604 does not include a plurality of rows of characters that constitute a paragraph. Therefore, the attribute information adding unit 302 does not add the attribute "body" to each of the area 601 and the area 604.

On the other hand, if the area size of other area is very small, the attribute information adding unit 302 determines that this area is "noise." Further, the attribute information adding unit 302 performs contour tracing processing on white pixels that exist inside the connected black pixels having lower pixel density. If circumscribing rectangles of the white pixel contours are arranged in good order, the attribute information adding unit 302 determines that the identified area is a "table." If the circumscribing rectangles of the white pixel contours are not arranged in good order, the attribute information adding unit 302 determines that the identified area is a "line drawing." Further, the remaining areas having higher pixel density can be regarded as illustrations or pictures. Therefore, the attribute information adding unit 302 adds the attribute "picture" to these areas.

Further, if a character area that was not identified as the body is present in the vicinity of, e.g., above or below, the area to which the "table", "line drawing", or "picture" attribute is added, the attribute information adding unit 302 determines that the identified area is a character area that explains the corresponding "table", "line drawing", or "picture" area. Therefore, the attribute information adding unit 302 adds the "caption" attribute to this character area. The attribute information adding unit 302 stores the area to which the attribute "caption" is added in association with information identifying the accompanying area (i.e., table/line drawing/picture area) so that the "caption" accompanied area can be easily identified.

Further, if the area size is larger than a character image of the body portion and the area position is different from the multiple column of the body portion, the attribute information adding unit 302 adds an attribute "heading" to the identified character area. Further, if the area size is larger than the character image of the body portion and the area position is above the multiple column of the body portion, the attribute information adding unit 302 adds an attribute "sub heading" to the identified character area. Further, if the area size is equal to or less than the character image of the body portion and the area position is an upper end portion or a lower end portion of the original, the attribute information adding unit 302 adds an attribute "page" (or "page header" or "page footer") to the identified character area.

Further, if the identified character area is not anyone of the "body", "heading", "sub heading", "caption", and "page" areas, the attribute information adding unit 302 adds an attribute "character" to the identified character area.

If the above-described attribute information addition processing is performed on the example illustrated in FIG. 6, the attribute "heading" is added to the area 601. The attribute "table" is added to the area 602. The attribute "picture" is added to the area 603. The attribute "caption" accompanying the area 603 is added to the area 604. The attribute "body" is added to the area 605.

The character recognizing unit 303 executes character recognition processing, in a manner conventionally known, on the area to which the attribute "character", "body", "heading", "sub heading", or "caption" is added (i.e., the area that includes a character image). The character recognizing unit 303 stores the row of resultant character codes as character information and associates the stored character information with the processed area.

The area position and size, area attribute information, page information, and character code information (i.e., character information resulting from the character recognition processing)), i.e., various information and data extracted by the area dividing unit 301, the attribute information adding unit 302, and the character recognizing unit 303, are stored in the storage unit 211.

FIG. 7 illustrates an example of information stored in the storage unit 211, which can be obtained through the processing performed on the input image data illustrated in FIG. 6. Although not described in detail in FIGS. 6 and 7, it is desired to add an attribute "table character" to a character image area in the table and perform character recognition processing to store the information as illustrated in FIG. 7.

The metadata processing unit 304 associates a metadata (i.e., information required to search the object) with the caption attached object (e.g., picture, line drawing, or table object) detected by the attribute information adding unit 302, and stores the associated data in the storage unit 211. In the present embodiment, a character string described in the caption of the object and a portion (e.g., a sentence) of the body that contains character (or a word) similar to that of the caption are associated with each other as the metadata that can be used to search the object.

The present embodiment uses a caption identifier to determine the character string to be used as the metadata. The caption identifier can be used to associate the caption attached object with the caption and body character information. The caption identifier can be selected from various identifiers, such as identification information (ID) to be used to identify each object, position information indicating a storage position of the caption and body character information (e.g., address and pointer indicating the recording position), and reference information (e.g., XMLPath or URL).

The present embodiment uses ID information that can identify each caption attached object in the following processing for inputting one page or sequentially inputting a plurality of pages. For example, a serial number of each page can be used.

First, the metadata processing unit 304 performs processing for generating a caption identifier (i.e., identification information) for the caption attached object that is detected by the attribute information adding unit 302. Then, the metadata processing unit 304 adds the generated caption identifier to the object.

Next, the metadata processing unit 304 extracts a metadata character string (guide, keyword, etc.) that corresponds to the object from the caption and body character information output by the character recognizing unit 303. The metadata processing unit 304 performs processing for associating the extracted metadata character string with a corresponding caption identifier and storing the associated data in the storage unit 211. In this case, the metadata processing unit 304 allocates a unique ID to express a correspondence relationship between the caption attached object and the metadata character string.

In this manner, the metadata processing unit 304 can associate the caption attached object (i.e., the object detected by the attribute information adding unit 302) with its metadata and can store the associated information in the storage unit 211.

The format converting unit 305 performs processing for converting the information (e.g., area position and size information, page information, area attribute, area character information, and metadata) obtained through the above-described sequential processing performed by the area dividing unit 301, the attribute information adding unit 302, the character recognizing unit 303, and the metadata processing unit 304, based on the input image data 300, into an electronic document having a predetermined format (PDF, SVG, XPS, OfficeOpenXML, etc.).

The electronic document generated through the above-described format conversion includes page display information based on graphics (e.g., image to be displayed) and content information based on characters or other meaning description (e.g., metadata).

Figure 5:
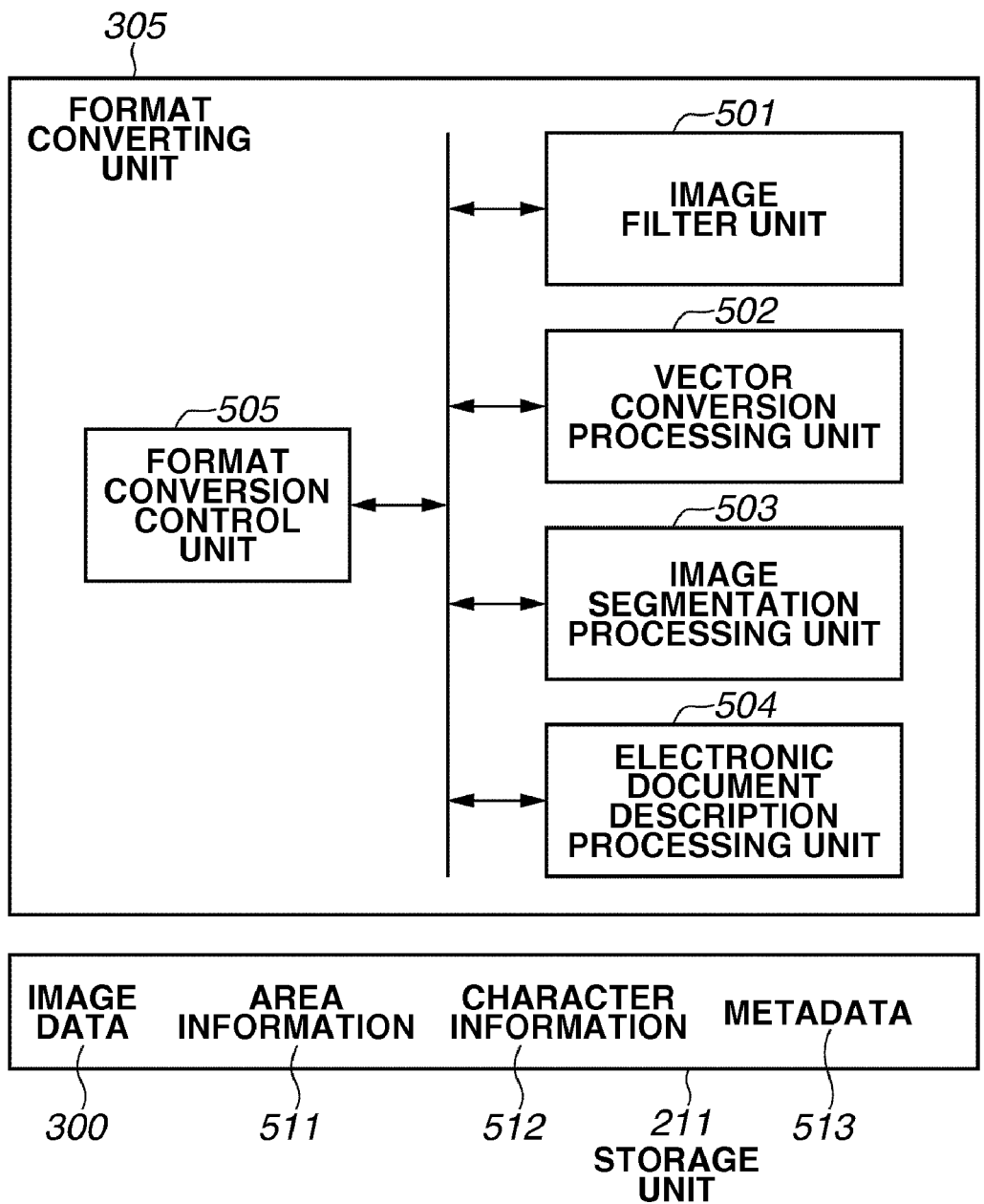
FIG. 5 is a block diagram illustrating an example configuration of a format converting unit 305 illustrated in FIG. 3.

FIG. 5 is a block diagram illustrating an example of a configuration of the format converting unit 305. An image filter unit 501 can perform filter processing (e.g., flattening, smoothing, edge enhancement, color quantization, and binarization) on the input image data. A vector conversion processing unit 502 can convert image data (e.g., an image of a portion corresponding to an area to which a line drawing attribute is added) into vector path description graphics data (i.e., vector data). The vector conversion processing unit 502 can use a conventional technique for converting image data into vector data.

An image segmentation processing unit 503 can segment image data (e.g., an image of a portion corresponding to an area to which a picture attribute is added) as image parts graphics data (e.g., JPEG data). An electronic document description processing unit 504 can generate an electronic document described according to a predetermined format, which includes the graphics data generated by the vector conversion processing unit 502 and the image segmentation processing unit 503 as well as the meaning description (e.g., character information and metadata) obtained by the character recognizing unit 303 and the metadata processing unit 304.

A format conversion control unit 505 can distribute each area of the image data 300 to an appropriate one of the processing units 501 to 503 based on area information (e.g., position, size, and attribute) 511, area character information 512, and metadata 513 stored in the storage unit 211 illustrated in FIG. 2. The format conversion control unit 505 can perform an overall control for the format converting unit 305 so that the data output from respective processing units can be appropriately integrated by the electronic document description processing unit 504.

The image filter processing unit 501 is a processing unit that can perform image filtering processing (e.g., flattening, smoothing, edge enhancement, color quantization, and binarization) on an image. When the vector conversion processing unit 502 and the image segmentation processing unit 503 perform the above-described processing, the image filter processing unit 501 performs image processing if necessary. Although not described in detail, the image filter processing unit 501 can perform image processing that is suitable for the vector conversion processing to be performed and can perform image processing that is suitable for the image segmentation processing to be performed.

The vector conversion processing unit 502 converts a set of target pixels that constitutes image area (line drawing, table ruled lines, etc.) into a graphics drawing expression using a vector path drawing function, more specifically, vector path description data.

An example of the vector conversion processing is described below. First, a conversion target image is converted into binary image data. For example, in a case where the conversion target image is a gray scale image, processing for obtaining binary data using the image filter processing unit 501 that compares the luminance of each pixel with a predetermined threshold value is performed. If the conversion target image includes a plurality of colors, each color component can be separated and binary data of each color can be generated.

Next, contour tracing processing is performed on a set of black pixels connected to each other in the binary data to acquire a contour coordinate point group of each set. Subsequently, the contour coordinate point group is adaptively divided into a plurality of sections, and each section is approximated by a linear function or a curve function. The curve function is, for example, a spline curve or a Bezier curve. Finally, the data is converted into a vector path description that defines a start point, linear and curve lines, and an end point.

The method for obtaining a vector is not limited to the above-described method. Any other appropriate method can be used. For example, instead of using the above-described function to approximate the contour, a method for obtaining a vector by applying the function approximation on a core line of a line drawing can be used.

The image segmentation processing unit 503 generates individual image parts data for a target area of the input image based on only the pixel data of the area. In executing the above-described processing, the pixel data type and the compression method can be appropriately changed considering the characteristics of each area.

For example, if the target area is an area accompanied by a "line drawing" or "character" attribute, the image filter processing unit 501 converts the image data into one or a plurality of binary images for each color. Then, the converted data is processed using the MMR or other conventionally-known binary compression method to generate data to which color information corresponding to each binary image is added. On the other hand, if the target area is an area accompanied by a "picture" attribute, the image data is subjected to the JPEG or JPEG 2000 compression that is suitable for a natural image.

One of the vector conversion to be performed by the vector conversion processing unit 502 and the image compression to be performed by the image segmentation processing unit 503 can be arbitrarily omitted considering the attribute of each area. Alternatively, it is desired to cause the vector conversion processing unit 502 to perform vector conversion processing and cause the image segmentation processing unit 503 to perform image compression processing. Further, in a case where a character area (e.g., body, heading, or caption) has a higher similarity in a character recognition result, graphics of the character area portion can be reproduced by describing a character code, character size information, and character position information that are included in the character recognition result.

The electronic document description processing unit 504 generates an electronic document described according to a predetermined format, which includes the graphics data generated by the vector conversion processing unit 502 and the image segmentation processing unit 503 as well as the meaning description (e.g., character information and metadata) obtained by the character recognizing unit 303 and the metadata processing unit 304.

FIG. 11 illustrates an example of the generated electronic document data 310. The example illustrated in FIG. 11 is the data described according to the Scalable Vector Graphics (SVG) format based on the data illustrated in FIG. 7, which have been obtained by processing the image data 300 illustrated in FIG. 6 and stored in the storage unit 211.

Detailed descriptions 1101 to 1105 illustrated in FIG. 11 are graphics descriptions corresponding to the areas 601 to 605 illustrated in FIG. 6, respectively. The graphics descriptions 1101, 1104, and 1105 are examples of the character drawing description based on character codes. The graphics description 1102 is an example of a vector converted vector path description. The graphics description 1103 is an example of the description for pasting a segmenting processed picture image.

A caption identifier 1107 (i.e., caption_id) having a value "1" is added to the caption accompanied picture object 1103. In the example illustrated in FIG. 11, coordinate values X1 and Y1 represent numerical values that are actually described.

FIG. 11 illustrates an example of a metadata description 1106. The metadata description 1106 includes a description "AAA" as a character string 1109, which is extracted based on a character string of the caption 604 and a character string of the body. The character string "AAA" is associated with an identifier 1108 similar to the caption identifier 1107.

According to the example illustrated in FIG. 11, the character string "AAA" is extracted from a body portion including a word "FIG. 1", i.e., from a sentence " . . . FIG. 1 is AAA . . . " and the extracted word "AAA" is described as the metadata 1109. However, the metadata is not limited to a word. Any sentence (e.g., a sentence that includes the character string "FIG. 1") can be added as metadata. Further, the metadata illustrated in FIG. 11 includes a character string extracted from the body. Additionally, a word extracted from the character string of the caption can be added as metadata.

Although the present embodiment is described based on the data according to the SVG format, the output format is not limited to the SVG. For example, PDF, XPS, Office Open XML, and other PDL data formats can be used for the above-described conversion.

An example of a conversion processing control to be performed by the format conversion control unit 505 is described below. A conversion processing method to be performed on each area by the format converting unit 305 is variable depending on the attribute of each area. For example, the format conversion control unit 505 can preferably apply the vector conversion processing to characters and line drawings, which are graphic images constituted by monochrome colors or a small number of colors. On the other hand, the format conversion control unit 505 cannot preferably apply the vector conversion processing to pictures or other gradational image area. In this respect, to enable the format conversion control unit 505 to appropriately perform the conversion processing according to the attribute of each area, it is desired to set a plurality of correspondence tables, beforehand, as illustrated in FIGS. 8A to 8D.

For example, according to the settings illustrated in FIG. 8A, the format conversion control unit 505 performs the vector conversion processing on respective areas of the "character", "line drawing", and "table" attributes. Further, the format conversion control unit 505 performs the image segmentation processing on the "picture" attribute attached area.

Further, the correspondence tables illustrated in FIGS. 8A to 8D include the execution of processing for deleting pixel information of the area from the image data 300. For example, in a case where the "character" attribute attached area is converted into vector path description data according to the settings illustrated in FIG. 8A, the format conversion control unit 505 performs processing for marking out pixels of the image data 300 that correspond to a portion covered by the converted vector path with the peripheral color according to a deletion processing instruction.

Similarly, in a case where the "picture" attribute attached area is segmented as rectangle image parts, the format conversion control unit 505 performs processing for marking out pixels of the image data 300 that correspond to each segmented area with the peripheral color. The purpose of performing the above-described deletion processing is to use the image data 300 as image parts data of the "background" after the processing on each area is finished (i.e., after the marking out processing is completed).

The image data for the background (i.e., a background image) includes a remaining portion other than the areas extracted through the area division processing (e.g., pixels of the image data 300 that correspond to the background). Accordingly, in the description of the electronic document data, the format conversion control unit 505 can constitute unredundant graphics data without losing any information of the background pixels (background color) by superimposing the graphics data obtained by the vector conversion processing unit 502 and the image segmentation processing unit 503 on the background image parts data (i.e., the background image) and displaying an obtained composite image.

FIG. 8B illustrates another example of the correspondence table. According to the settings illustrated in FIG. 8B, the format conversion control unit 505 performs binary image segmentation processing on the "character" attribute attached area and also performs pixel deletion processing on the image data 300. On the other hand, the format conversion control unit 505 does not perform the vectorization processing and the image segmentation processing on the remaining attribute attached areas. More specifically, the pixels that are not included in the processing target (e.g., pixel information of the areas accompanied by the "picture", "line drawing", and "table" attributes) remain in the background image parts data. Therefore, the format conversion control unit 505 superimposes the "character" image parts on the background image.

The format conversion control unit 505 can perform similar processing based on the settings defined in another correspondence tables illustrated in FIGS. 8C and 8D, described in detail below.

Further, the format conversion control unit 505 can select an optimum one of a plurality of correspondence tables, which are prepared beforehand as illustrated in FIGS. 8A to 8D, according to the use application (i.e., purpose of use) of electronic document data to be output or according to the contents of each document. For example, the output image data resulting from the settings defined by the correspondence table illustrated in FIG. 8A includes objects most of which is converted into the vector path description. Therefore, the output image can maintain excellent image quality in the enlargement/reduction processing and can be preferably reusable for a graphic editor.

Further, the settings defined in the correspondence table illustrated in FIG. 8B are useful in that each character image portion is reproducible as a high-quality image by generating an individual binary image for each character color of the character image and losslessly compressing each binary image as well as in that the data size compression rate can be maintained at a higher level by JPEG compressing the remaining portion as a background image. Accordingly, the settings defined in the correspondence table illustrated in FIG. 8B can be preferably employed to generate an output image that includes an image of characters that are easy to read even when the compression rate is high.

Next, an example of overall processing to be executed by the image processing system according to the present embodiment is described below with reference to a flowchart illustrated in FIG. 4. The data processing unit 218 illustrated in FIG. 2 (i.e., each processing unit illustrated in FIG. 3) can execute the processing of the flowchart illustrated in FIG. 4.

Figure 3:
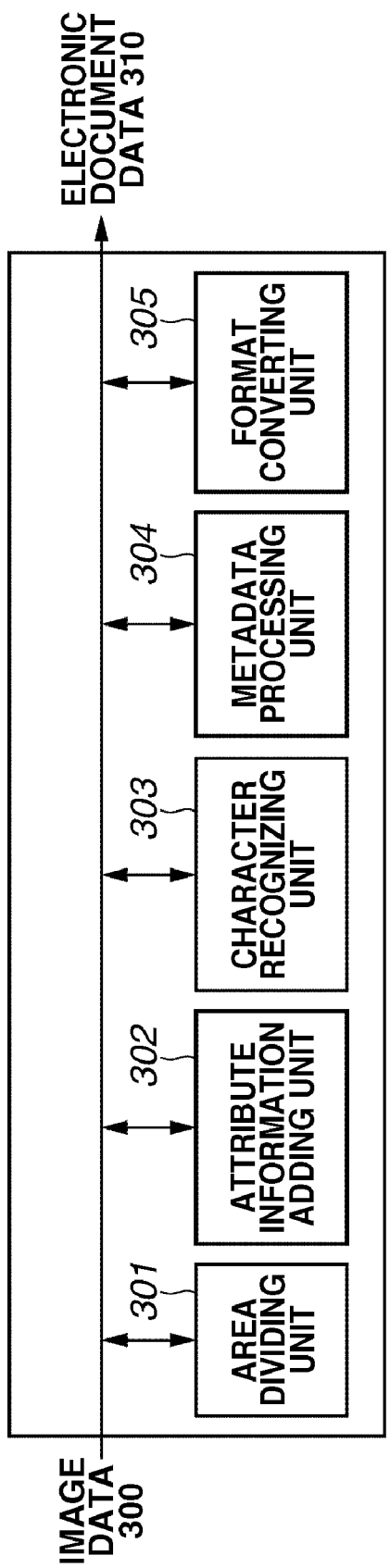
FIG. 3 is a block diagram illustrating an example configuration of a data processing unit 218 illustrated in FIG. 2.

In the present embodiment, the CPU 205 reads a computer program from the storage unit 211 (i.e., a computer-readable storage medium) and executes the read program to realize the functions of the data processing unit 218 (i.e., each processing unit illustrated in FIG. 3). However, the present invention is not limited to the above-described configuration. For example, the data processing unit 218 (i.e., each processing unit illustrated in FIG. 3) can be realized by an electronic circuit or other comparable hardware configuration.

Figure 4:
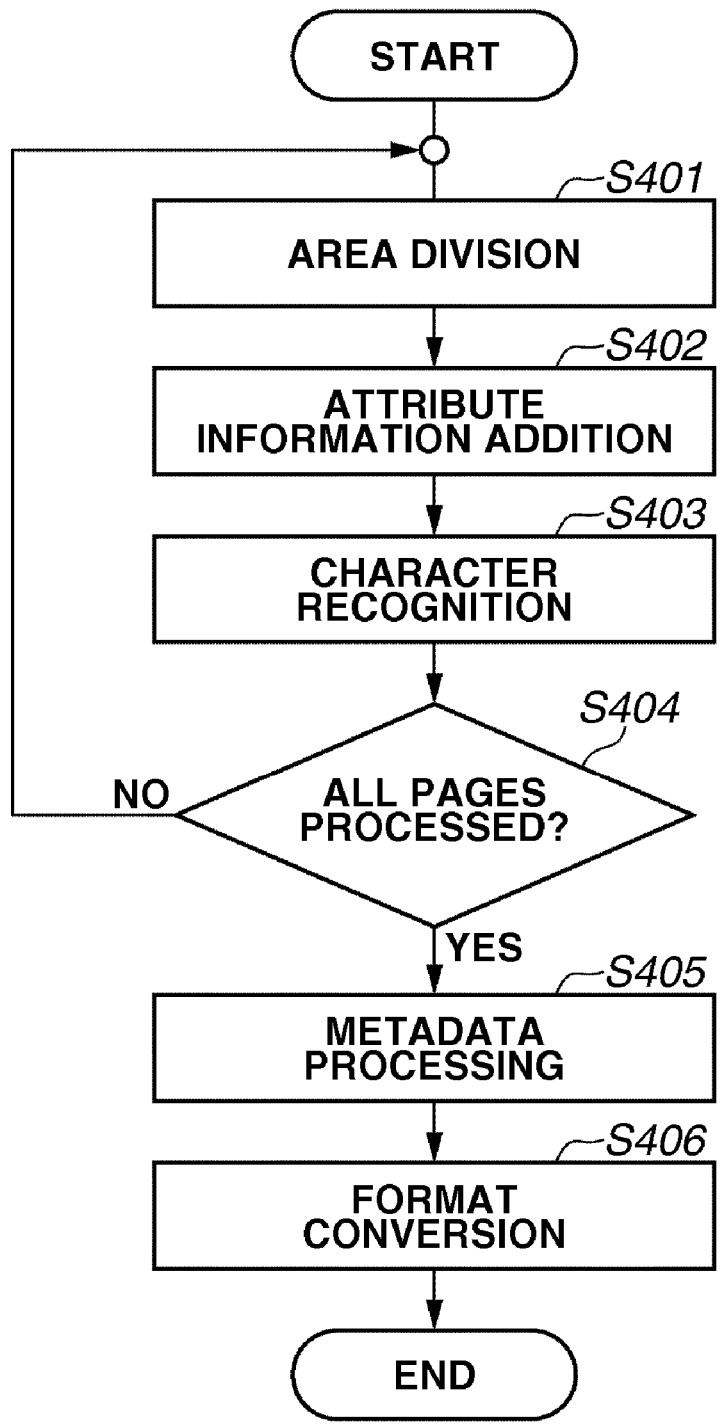
FIG. 4 is a flowchart illustrating an example procedure of processing to be executed by the image processing system according to an embodiment of the present invention.
Figure 9:
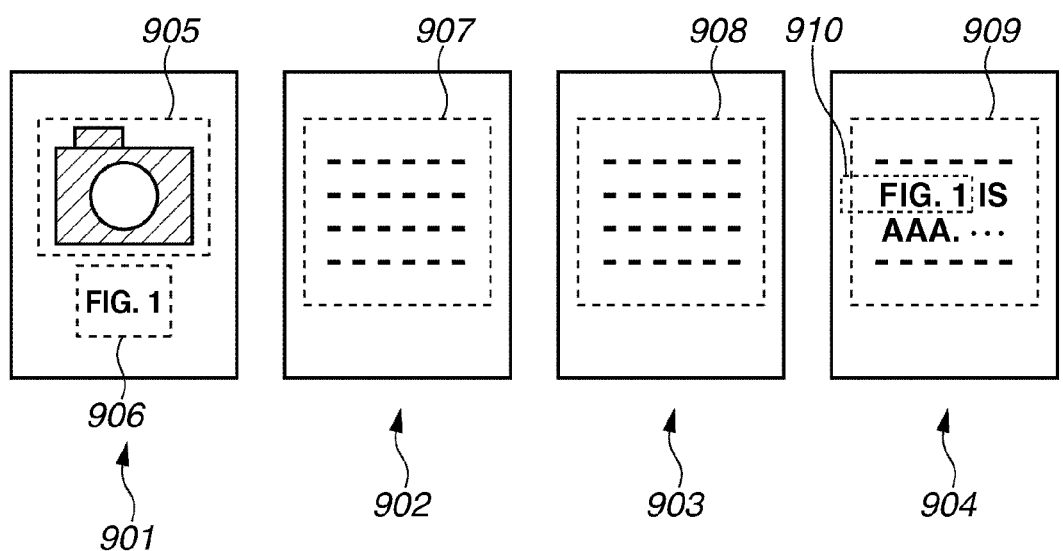
FIG. 9 illustrates an example of input image data according to an embodiment of the present invention.

FIG. 4 is a flowchart illustrating an example procedure of processing to be executed by the image processing system according to the present invention to convert an image data including a plurality of pages input by the MFP 100 illustrated in FIG. 1 into electronic document data including a plurality of pages. For example, page images 901 to 904 illustrated in FIG. 9 can be input as the image data including a plurality of pages. FIG. 9 illustrates an example of a document image including four pages. The images 901 to 904 correspond to the first to fourth pages, respectively. Each processing of the flowchart illustrated in FIG. 4 is described below in detail.

In step S401, the area dividing unit 301 extracts segmented areas from the input image data of one page. For example, the area dividing unit 301 extracts two areas 905 and 906 from the image data 901 (i.e., the first page) illustrated in FIG. 9.

In step S402, the attribute information adding unit 302 adds an attribute to each area segmented in step S401. According to the example of the first page illustrated in FIG. 9, the attribute information adding unit 302 adds an attribute "picture" to the area 905 and also adds an attribute "caption" to the area 906. In this case, the information to be added to the caption 906 includes information indicating that the "area" 905 is accompanied by the area 906.

In step S403, the character recognizing unit 303 executes character recognition processing on the area to which a character attribute (e.g., body, caption, heading, or sub heading) is added in step S402. The character recognizing unit 303 stores each processing result as character information in association with the target area. According to the example of the first page illustrated in FIG. 9, the character recognizing unit 303 executes character recognition processing on the area 906 to which the character attribute "caption" is added, and associates obtained character information "FIG. 1" with the area 906.

In step S404, the data processing unit 218 determines whether the information extraction processing in steps S401 to S403 has been completed for all pages. If it is determined that the information extraction processing in steps S401 to 5403 has been completed for all pages (YES in step S404), the processing proceeds to step S405. If it is determined that the information extraction processing in steps S401 to 5403 has not been completed for all pages (NO in step S404), the image processing system repeats the above-described processing in steps S401 to S403.

FIG. 10 illustrates examples of extracted area position/size information, page information, area attribute, and area character information, which are obtained as processing results in steps S401 to S404 performed on the images 901 to 904 illustrated in FIG. 9. In FIG. 10, areas 907 to 909 are "body" attribute areas extracted from the second to fourth pages. The extracted information is stored in the storage unit 211.

In step S405, the metadata processing unit 304 performs metadata extraction processing and metadata addition processing. The processing to be executed by the metadata processing unit 304 in step S405 is described below in detail with reference to a flowchart illustrated in FIG. 12.

Figure 12:
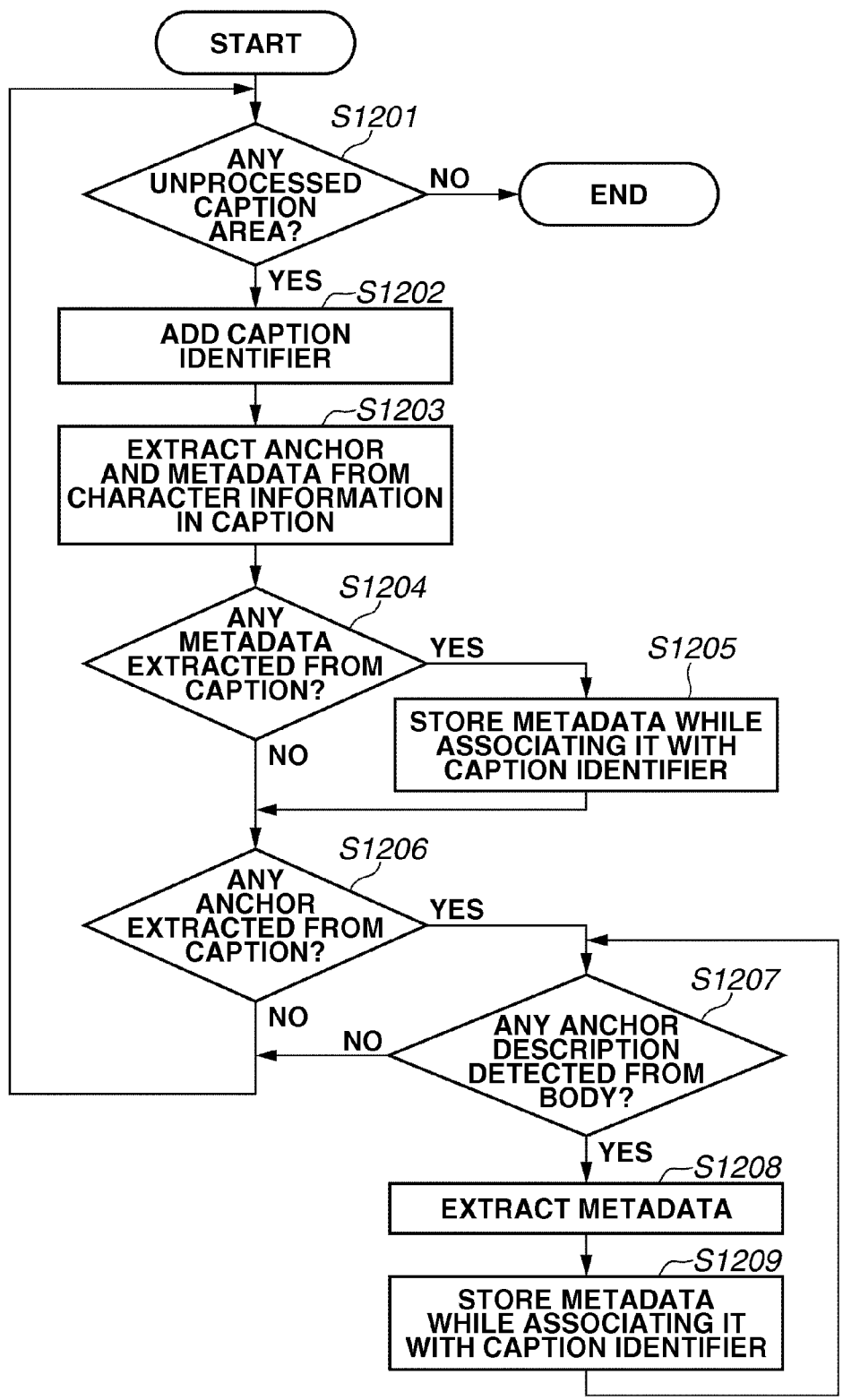
FIG. 12 is a flowchart illustrating an example procedure of processing to be executed by a metadata processing unit 304 illustrated in FIG. 3.

In step S1201 of FIG. 12, the metadata processing unit 304 selects one of the "caption" attribute added areas, which is not yet subjected to the metadata processing, from the area information stored in the storage unit 211. More specifically, if it is determined that there is an unprocessed caption area (YES in step S1201), the metadata processing unit 304 selects the unprocessed caption area as a processing target. Then, the processing proceeds to step S1202. If it is determined that there is not any caption area, or if it is determined that the processing of all areas is already completed (NO in step S1201), the metadata processing unit 304 terminates the processing. In a case where the images 901 to 904 illustrated in FIG. 9 are input, the metadata processing unit 304 selects the caption area 906.

In step S1202, the metadata processing unit 304 adds a caption identifier to an object that is accompanied by the processing target caption. The metadata processing unit 304 further secures a metadata storage area in the storage unit 211 as a storage area dedicated to the added caption identifier. In the present embodiment, the metadata processing unit 304 allocates a caption identifier #1 to the picture object 905 accompanied by the caption 906 and secures a metadata storage area dedicated to the caption identifier #1 in the storage unit 211.

In step S1203, the metadata processing unit 304 extracts an anchor character string and a metadata character string from the character information that represent the character recognition result in the caption area. The anchor character string is character information that identifies an object in the original document that is accompanied by the caption. The metadata character string is character information that explains the object.

FIG. 15 illustrates anchor character strings 1501 and 1502 and metadata character strings 1503 and 1504 as examples of the anchor character string and the metadata character string in the caption area. As understood from FIG. 15, an object is accompanied by either one or both of the anchor character string and the metadata character string.

In many cases, expression of an anchor character string is a combination of a specific character string (e.g., "FIG.") and a number (or a symbol). Therefore, it is desired to prepare an anchor character string dictionary that registers a plurality of specific character strings beforehand. In this case, an anchor portion (i.e., anchor character string+number (or symbol)) can be specified based on a comparison between a caption character string and the dictionary. Further, a character string other than the anchor portion in the caption area can be identified as a metadata character string.

In step S1204, the metadata processing unit 304 determines whether there is any metadata character string extracted from the caption area in the processing of step S1203. If it is determined that the metadata character string has been extracted (YES in step S1204), the processing proceeds to step S1205. If it is determined that the metadata character string has not been extracted (NO in step S1204), the processing proceeds to step S1206.

In step S1205, the metadata processing unit 304 stores the metadata character string extracted from the caption area into the caption identifier storage area added in step S1202. Then, the processing proceeds to step S1206. More specifically, the metadata processing unit 304 associates the metadata character string extracted from the caption area with the caption identifier.

In step S1206, the metadata processing unit 304 determines whether there is any anchor character string extracted from the caption area in the processing of step S1203. If it is determined that the anchor character string has been extracted (YES in step S1206), the processing proceeds to step S1207. On the other hand, if it is determined that the anchor character string has not been extracted (NO in step S1206), the processing returns to step S1201. In step S1201, the metadata processing unit 304 determines whether there is any unprocessed caption area that remains.

According to the input image data illustrated in FIG. 9, "FIG. 1" can be extracted from the caption 906 as the anchor character string. However, no metadata character string can be extracted. Therefore, the processing proceeds to from step S1204 to steps S1206 and S1207.

In step S1207, the metadata processing unit 304 detects a character string expression similar to the extracted anchor character string from character information of the "body" area stored in the storage unit 211. If it is determined that a similar character string expression is detected (YES in step S1207), the processing proceeds to step S1208. If it is determined that there is not any similar character string expression (NO in step S1207), the processing returns to step S1201 to determine whether there is any unprocessed caption area that remains.

In step S1208, the metadata processing unit 304 extracts a character string that corresponds to the metadata of the object in the peripheral area of the anchor character string that has been detected from the body in the processing of step S1207. According to the input image data illustrated in FIG. 9, a character string 910 can be detected from the body area 909 as a character string similar to the anchor character string "FIG. 1" 906. Therefore, a word "AAA" can be extracted as a metadata character string if morpheme analysis is performed on a neighboring character string "FIG. 1 is AAA . . . ".

To identify the metadata character string, a word segmenting function can be used in the morpheme analysis of natural language processing. In the present embodiment, a single word is extracted as the metadata character string. However, extraction of the metadata character string is not limited to the above-described example. For example, a whole sentence including the anchor character string can be used as a metadata character string.

In step S1209, the metadata processing unit 304 adds (stores) the metadata character string extracted in step S1208 to the caption identifier storage area. Then, the processing returns to S1207. The metadata processing unit 304 repeats the above-described processing for detecting a description of an anchor character string in another portion of the body and, if detected, successively storing each detected character string. Accordingly, two or more metadata may be associated with one caption identifier.

Referring back to FIG. 4, in step S406, the format converting unit 305 performs conversion of the image data into the electronic document data 310 based on the image data 300 and the information stored in the storage unit 211 illustrated in FIG. 10.

As described in FIG. 5, the format converting unit 305 executes conversion processing on an area in the image data 300 illustrated in FIG. 5 according to the correspondence table that describes a conversion processing method to be applied to each area under the control of the format conversion control unit 505. In the present embodiment, an example of processing for controlling the conversion using the correspondence table illustrated in FIG. 8C is described below with reference to a flowchart illustrated in FIG. 13.

In step S1301, the format conversion control unit 505 initializes a processing page number counter "n" to 1. In step S1302, the format conversion control unit 505 selects an unprocessed area from the data of an n-th page in the area information 511 illustrated in FIG. 5 as a processing target area.

In step S1303, the format conversion control unit 505 branches the processing according to the attribute of the processing target area and the correspondence table. In the present embodiment, the format conversion control unit 505 determines whether the attribute of the selected processing target area is "character" with reference to the correspondence table illustrated in FIG. 8C. More specifically, if it is determined that the attribute of the selected processing target area is "character" (e.g., "body", "caption", "page", or "heading") (YES in step S1303), the processing proceeds to step S1304. If it is determined that the attribute of the selected processing target area is "picture", "line drawing", or "table" (NO in step S1303), the processing proceeds to step S1306.

In step S1304, the image segmentation processing unit 503 generates a binary image (i.e., binary image parts) of a portion that corresponds to the character attribute attached area (i.e., the processing target) in the image data 300 according to the settings defined in the correspondence table illustrated in FIG. 8C. The generated binary image parts can be compressed, for example, according to a PNG format and can be stored in the storage unit 211 illustrated in FIG. 2.

In the present embodiment, character color information is added to pixels that correspond to a character line in the binary image parts. The character color information can be acquired from the color of the character pixel in the image data 300. Meanwhile, the color information allocated to other pixels is a transparent color.

In step S1305, the format conversion control unit 505 performs deletion processing for marking out the pixels corresponding to the character portion in the image data 300 illustrated in FIG. 5 with the color of peripheral pixels, because the deletion processing instruction is set for the character area in the correspondence table illustrated in FIG. 8C.

In step S1306, the format conversion control unit 505 determines whether there is a caption identifier attached to the processing target area. If it is determined that the caption identifier attached to the processing target area is present (YES in step S1306), the processing proceeds to step S1307. If it is determined that no caption identifier is attached to the processing target area (NO in step S1306), the processing proceeds to step S1308.

In step S1307, the format conversion control unit 505 causes the vector conversion processing unit 502 to generate vector path description data of a frame that surrounds the processing target area according to the settings defined in the correspondence table illustrated in FIG. 8C. The vector path description data of the frame that surrounds the processing target area can be described with four lines that define the processing target area, for example, based on coordinate values representing the upper left corner and the size (width and height) registered in the area information 511 illustrated in FIG. 5.

In the present embodiment, the format conversion control unit 505 describes a rectangle frame that is slightly larger than the rectangle that circumscribes the processing target area. The frame surrounding the processing target area is not limited to a rectangle frame. The frame can be replaced with a frame having round corners. The frame line can be thickened. The frame shape can be modified arbitrarily.

Another method for describing the frame shape includes extracting a contour of edge information (e.g., a contour of the object image) from an area image in the image data 300 and converting the extracted contour information into vector path information of the frame using the vector conversion processing unit 502.

Further, in step S1307, the format conversion control unit 505 adds a caption identifier of the processing target area to the generated vector path description data of the frame. Further, the format conversion control unit 505 allocates a transparent color as a drawing color to be used for the vector path description data of the frame. The vector path description data generated in this manner can be stored in the storage unit 211 illustrated in FIG. 2.

In step S1308, the format converting unit 305 determines whether there is any unprocessed area in the n-th page. If it is determined that the unprocessed area is present in the n-th page (YES in step S1308), the processing returns to step S1302 and repeats the above-described processing of steps S1302 to S1308. If it is determined that the processing for all areas in the n-th page is completed (NO in step S1308), the processing proceeds to step S1309.

In step S1309, the format conversion control unit 505 generates background image parts by marking out a portion that corresponds to the area segmented by the image segmentation processing unit 503 in the image data 300 illustrated in FIG. 5 with the peripheral color. The background image parts do not include any pixels that constitute a character portion segmented as image parts from the image data 300 in step S1305 (e.g. pixels corresponding to a character line) because the pixels constituting the character portion are deleted through the processing for marking out the character pixels with the peripheral color.

On the other hand, areas that are not accompanied by the character attribute remain unprocessed. In the present embodiment, the format conversion control unit 505 reduces the resolution of the background image parts to a half level and compresses the background image parts into image data according to the JPEG compression method. The compressed image data can be stored in the storage unit 211 illustrated in FIG. 2. However, the format conversion control unit 505 can perform other image processing (e.g., smoothing processing) and compress the processed data according to another format.

FIG. 16 illustrates examples of the image parts and the vector path description data that can be generated when the image 901 of the first page illustrated in FIG. 9 is subjected to the above-described processing of steps S1302 to S1309.

An example image 1601 illustrated in FIG. 16 includes the background image parts generated in step S1309. The background image parts image 1601 does not include any character image portion because the character image portion is deleted by the peripheral color through the marking out processing. In this respect, the background image parts image 1601 is a piece of image that includes all parts other than the portion extracted as characters in the page.

An example image 1602 illustrated in FIG. 16 includes binary image parts of the character portion generated in step S1304. In the reproduction of the binary image parts of the character portion, the character line portion can be constructed by pixels of the character color according to the character color information stored separately and the remaining white portion can be constructed by pixels of the transparent color. A solid line indicating the outer frame of the image 1602 is an expediential one, although actual image parts can be defined in a minimized rectangle region that surrounds the character portion.

An example image 1603 illustrated in FIG. 16 includes the vector path description data of the frame generated in step S1307. Although a dotted line is used to express the vector path description of the frame, the actual vector path description is invisible because the transparent color is used for the vector path description. Further, a solid line indicating the outer frame of the image 1603 is an expediential one that is not present as data.

In step S1310, the format conversion control unit 505 causes the electronic document description processing unit 504 to perform processing for describing the presently processed page as an electronic document page according to the format of the electronic document data to be output.

FIG. 17 illustrates an example of the electronic document page that can be described based on the image 901 of the first page illustrated in FIG. 9 according to the present embodiment. An electronic document page 1700 illustrated in FIG. 17 is an example described according to the Scalable Vector Graphics (SVG) format.

The electronic document page 1700 includes a description 1701 for the background image data generated in step S1309, a binary image parts description 1702 for the character portion generated in step S1304, and a vector path description 1703 for the frame generated in step S1307 (although the frame is drawn by the transparent color).

In the vector path description 1703, a description stroke="transparent" indicates that the frame is a line to be drawn with the transparent color. More specifically, a description d="M440,608 L2040,608 L2040,1880 L440,1880L440, 608 s" indicates that that graphic having a vector path described shape is drawn with the transparent color.

As described above, the vector path description is not limited to the shape of a rectangle frame. An arbitrary shape can be used for vector path description without depending on the original shape of target object or the configuration in the graphics description.

The graphics drawing descriptions 1701 to 1703 correspond to the images 1601 to 1603 illustrated in FIG. 16, respectively. The descriptions 1701 to 1703 define the order of graphics data to be superimposed. More specifically, a background image is drawn as the lowest layer. A character image is drawn as an intermediate layer to be superimposed on the background image. A transparent frame is drawn as an upper layer to be superimposed on the character image. The transparent vector path description (i.e., graphics description) 1703 includes a caption identifier 1704.

In step S1311, the format conversion control unit 505 determines whether the page number "n" of the presently processed page is the final page number (i.e., the total number of all pages). If it is determined that the page number "n" of the presently processed page is equal to the final page number (YES in step S1311), the format conversion control unit 505 determines that the conversion processing for all pages has been completed. The processing proceeds to step S1313. If it is determined that the page number "n" of the presently processed page is less than the total number of all pages (NO in step S1311), the processing proceeds to step S1312. In step S1312, the format conversion control unit 505 increments the page number "n" by 1 (i.e., n=n+1). Then, the processing returns to step S1302 to repeat the above-described processing for the next page.

In step S1313, the electronic document description processing unit 504 assembles all electronic document pages described in step S1310 and adds the metadata description to generate electronic document data to be output.

FIG. 18 illustrates an example description of the electronic document to be output. An electronic document data 1800 includes electronic document page descriptions 1801, 1802, 1803, and 1804 that correspond to the first to fourth pages, respectively. The electronic document data 1800 further includes a metadata description 1805. The metadata description 1805 includes a metadata character string 1806 that is described in association with a caption identifier 1807. The caption identifier 1807 is identical to a caption identifier 1808 added to a vector path description 1809 for the first page.

As described above, the metadata 1806 and the transparent frame vector path description 1809 are associated (linked) with each other with the caption identifier 1807. Therefore, the transparent frame vector path description 1809 can be found out if the search processing is performed by inputting the keyword "AAA."

The above-described embodiment relates to electronic document data generation processing according to the first embodiment of the present invention.

Next, an example operation for searching an object from the electronic document data generated in the above-described first embodiment while designating the above-described metadata as a keyword to be searched is described below with reference to FIG. 14.

FIGS. 14A to 14D illustrate examples of the display screen (GUI) provided by an application software to be executed by the client PC 101 illustrated in FIG. 1 or other client PC, which can be used to search an object. For example, Adobe Reader® is the software application usable when the format of a document to be generated is PDF.

Figure 14A:
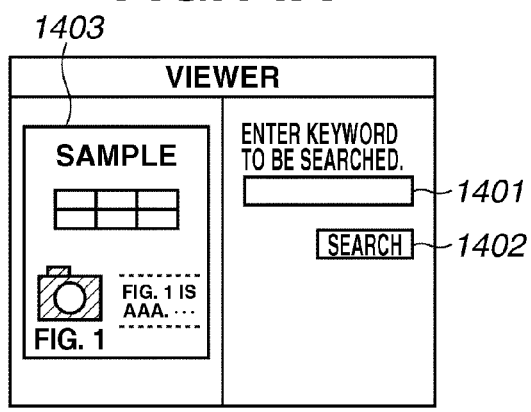
FIGS. 14A to 14D illustrate examples of the display screen provided by an application that enables users to browse and search electronic document data.

FIG. 14A is an example screen to be displayed by the application based on the document illustrated in FIG. 11. An input window 1401 enables users to input (designate) a word or a phrase to be searched. A search execution button 1402 enables users to instruct execution of the search after the word (or the phrase) to be searched is input. A display image 1403 is an example resulting from the electronic document data 1100 illustrated in FIG. 11. The display contents are based on the graphics descriptions 1101 to 1105.

The application illustrated in FIG. 14 has a highlight display function for emphasizing a graphics description that includes a caption identifier associated with the metadata if a character string entered as the word (or phrase) to be searched in the input window 1401 coincides with the metadata added to the electronic document data currently displayed.

Figure 14C:
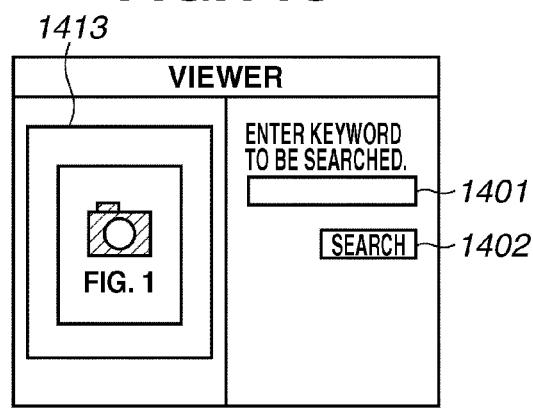
Figure 14B:
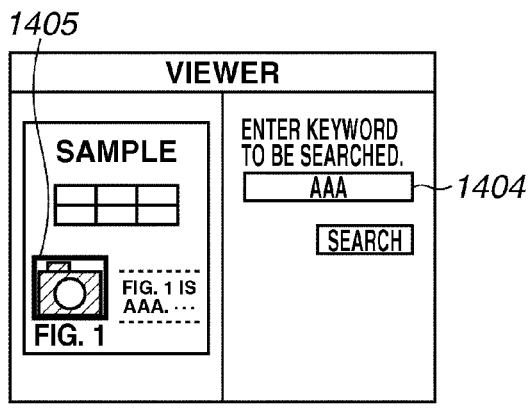

FIG. 14B illustrates a result of the search having been executed based on "AAA" 1404 designated as the word to be searched. In the electronic document data 1100, the character string 1109 in the metadata description 1106 and the character string "AAA" in the character drawing description 1105 coincide with the word to be searched. Therefore, the application performs an operation to be performed when the searched word is hit. The search result can be sequentially displayed according to an instruction from a user. An example operation according to the present embodiment is performed when the character string 1109 in the metadata description 1106 is hit.

The application illustrated in FIG. 14 detects the caption identifier 1108 of the metadata that coincides with the word (or phrase) to be searched from the electronic document 1100. The application illustrated in FIG. 14 further detects the graphics description 1102 to which the same identifier 1107 is attached. Then, the application illustrated in FIG. 14 draws a target graphics description so that the corresponding portion can be highlighted in the page display. In the present embodiment, the graphics description is the pasting of an image. Therefore, a display to be performed by the application illustrated in FIG. 14 includes adding a frame of a highlight color, e.g., a red color, which surrounds the image object.

A red color frame 1405 illustrated in FIG. 14B is a highlighted portion that indicates an object that has been hit as a result of the search executed. The highlight display method is not limited to the above-described example. Another frame color can be also used. The entire area can be colored. The color can be modified. The color can be reversed. Further, in a case where the description of the hit object is not limited to the pasting of the image but also includes a vector path, a color that is different from an ordinary color or a thicker line can be used to draw the vector path.

FIG. 14C illustrates the first page of the electronic document data 1800 illustrated in FIG. 18, which can be converted from the images of four pages illustrated in FIG. 9 by performing the processing of the flowchart illustrated in FIG. 13 based on the correspondence table illustrated in FIG. 8C.

The display content is a drawing result of the graphics description 1801 of the first page, which is comparable to a composite image obtainable by superimposing the character image 1602 on the background parts image 1601 illustrated in FIG. 16. The vector path description of the frame image 1603 includes designation of a transparent color. Therefore, the frame is invisible in an ordinary state.

Figure 14D:
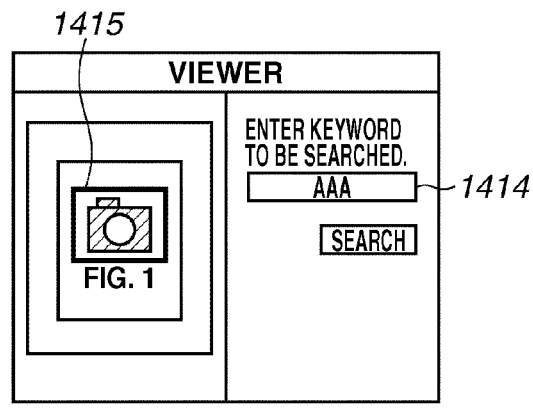

FIG. 14D illustrates a result of the search executed on the electronic document data 1800 illustrated in FIG. 14C. The word "AAA" to be searched is input in an input window 1414. In the electronic document data 1800, the character string "AAA" in the metadata description 1805 coincides with the word to be searched. Therefore, the application performs the operation to be performed when the searched word is hit.

More specifically, similar to the above-described description, the application detects a graphics description having an attached value that is the same as the caption identifier 1807 of the metadata. Then, the application performs a highlight display for the hit portion in the page display. In this case, the target to be highlighted is the transparent frame vector path description 1809 to which the caption identifier 1808 is added. The application draws the frame corresponding to the vector path description 1809 with a highlight color (e.g., a red color) instead of using the transparent color designated beforehand.

Accordingly, a red colored graphics description 1415 that corresponds to the metadata having been hit through the search is displayed as a highlighted frame in a visible state, which is superimposed on the background image. Therefore, users can recognize the picture portion corresponding to the search hit portion in the background image.

As described above, when a document image is converted into electronic document data based on the settings defined in the correspondence table illustrated in FIG. 8C, the caption attached object and the metadata to be used for the search can be extracted in association with each other from the area objects extracted from the document image, through the processing of steps S401 to 5405.

Further, regarding the objects other than characters, these objects are included in the background image according to the settings defined in the correspondence table illustrated in FIG. 8C. Therefore, through the processing of step S406 (see FIG. 13), the shape to be highlighted in the search is added by the vector path drawing description based on the transparent color, instead of the object to be searched. When users browse and search the electronic document data through the application, the vector path description based on the transparent color is invisible and therefore the background image of the page is directly displayed.

On the other hand, if the metadata is hit in the search, the application displays the transparent color vector path description with a highlight color. An arbitrary shape can be designated in the vector path description without depending on the original shape of the target object or the configuration in the graphics description. Therefore, an arbitrary shape that reflects a user's intent in the generation of the electronic document data can be used for the highlight display.

For example, a portion corresponding to the target object can be encircled with a frame in the search by describing a rectangle frame that is slightly larger than a circumscribing rectangle of the target object. Therefore, users can easily recognize the target object. For example, if a round-cornered frame is designated in the vector path description, a portion corresponding to the target object can be highlighted with a round frame in the display for the search.

More specifically, in the processing for generating electronic document data that enable users to designate an object other than characters to perform a keyword search, the present embodiment can generate electronic document data suitable for a highlight expression, which is easy for users to recognize in the search without depending on the shape or the data state of the search target object.

Further, even in a state where the objects other than characters are included in the background image, a display realized according to the above-described embodiment can bring an effect of letting users feel as if the target object has been hit in the search. In this case, it is unnecessary to compress individual objects other than character. The data amount can be reduced.

In the above-described first embodiment, all of the objects other than characters (e.g., pictures, line drawings, and tables) are included in the background image according to the correspondence table illustrated in FIG. 8C. A transparent vector path description is generated for a corresponding object to which a caption identifier is added. A second embodiment is different from the above-described first embodiment in that objects accompanied with specific attributes are not included in the background image and are described as parts. Namely, the second embodiment does not merge all of the objects other than characters into the background image. Further, in the second embodiment, transparent vector path descriptions for the highlight display are individually generated.

In the second embodiment, the format converting unit 305 illustrated in FIG. 3 performs the following control processing based on the correspondence table illustrated in FIG. 8D. According to the settings defined in the correspondence table illustrated in FIG. 8D, the format converting unit 305 performs image segmentation processing to generate image parts descriptions for "picture" objects. The format converting unit 305 further generates vector path descriptions for "line drawing" and "table" objects by executing a vector conversion. Moreover, the format converting unit 305 separately adds a transparent frame vector path description if a caption identifier is added to the object.

Therefore, according to the settings defined in the correspondence table illustrated in FIG. 8C, the format converting unit 305 adds a caption identifier to the graphics description of respective "picture" objects and adds a caption identifier to the transparent frame description of respective "line drawing" and "table" objects.

If the search is performed on the electronic document data having been subjected to the above-described conversion, a rectangle area that represents a segmenting region of the graphics description itself is highlighted in each rectangular "picture" area and the shape described as the transparent frame is highlighted for the "line drawing" and "table" objects.

Accordingly, the highlight display can be realized using the predetermined shape defined by the added transparent vector path description without depending on the shape of the "line drawing" or the "table." This brings an effect of realizing a display that enables users to easily recognize the portion having been hit in the search. Further, the type of an object that uses the transparent vector path description can be set according to the attribute.

Further, it is useful to enable users to appropriately select an optimum method with respect to the image parts description based on the segmentation of search targets ("pictures", "line drawings", "tables", etc.) from the electronic document data as well as addition of the caption identifier to the description.

For example, in a case where the data size of electronic document data to be generated is prioritized and realization of an object search is requested, it is desired to merge the "picture" objects into the "background" and perform the transparent frame description to add the caption identifier as illustrated in FIG. 8C. This brings an effect of letting users to feel as if an object in the image has been searched. The compression rate of image data can be improved. The data size can be decreased.

Further, in a case where the "picture" and "line drawing" objects may be reused in another document, the format converting unit 305 segments "picture" image parts and increases the image resolution as illustrated in FIG. 8A. The format converting unit 305 further performs the vector path description based on the vector conversion of the "line drawing" and directly adds a caption identifier to each object.

Further, the format converting unit 305 can perform more precise conversion processing according to the type of each "picture" object as illustrated in FIG. 8D. In this case, the format converting unit 305 can copy the information of a portion having been searched to other document for the purpose of reusing the acquired image information without discarding it uselessly.

As described above, the format converting unit 305 appropriately selects an image segmentation based image parts describing method and appropriately selects a caption identifier adding method. Therefore, the format converting unit 305 can generate electronic document data according to the purpose of use. Therefore, the present embodiment can bring an effect of providing electronic document data that can be easily handled by users.

In the present embodiment, the image segmentation based image parts describing method and the caption identifier adding method can be automatically selected according to the number of "picture" objects in a document or in a page or according to the size or characteristics of each object, instead of allowing users to select preferable methods. Further, in this case, the image segmentation based image parts describing method and the caption identifier adding method can be automatically selected for each document or each page.

An example method for switching between a "file size prioritized" mode and a "reusability prioritized" mode for processing electronic document data is described below with reference to a flowchart illustrated in FIG. 19, which can be performed by the data processing unit 218 according to the settings defined in the correspondence table illustrated in FIG. 8D. In the present embodiment, steps similar to those described in the first embodiment (see FIG. 13) are denoted by the same step numbers and detailed descriptions for these steps are not repeated.

In step S1901, the data processing unit 218 determines whether the "file size prioritized" mode is selected.

Figure 20:
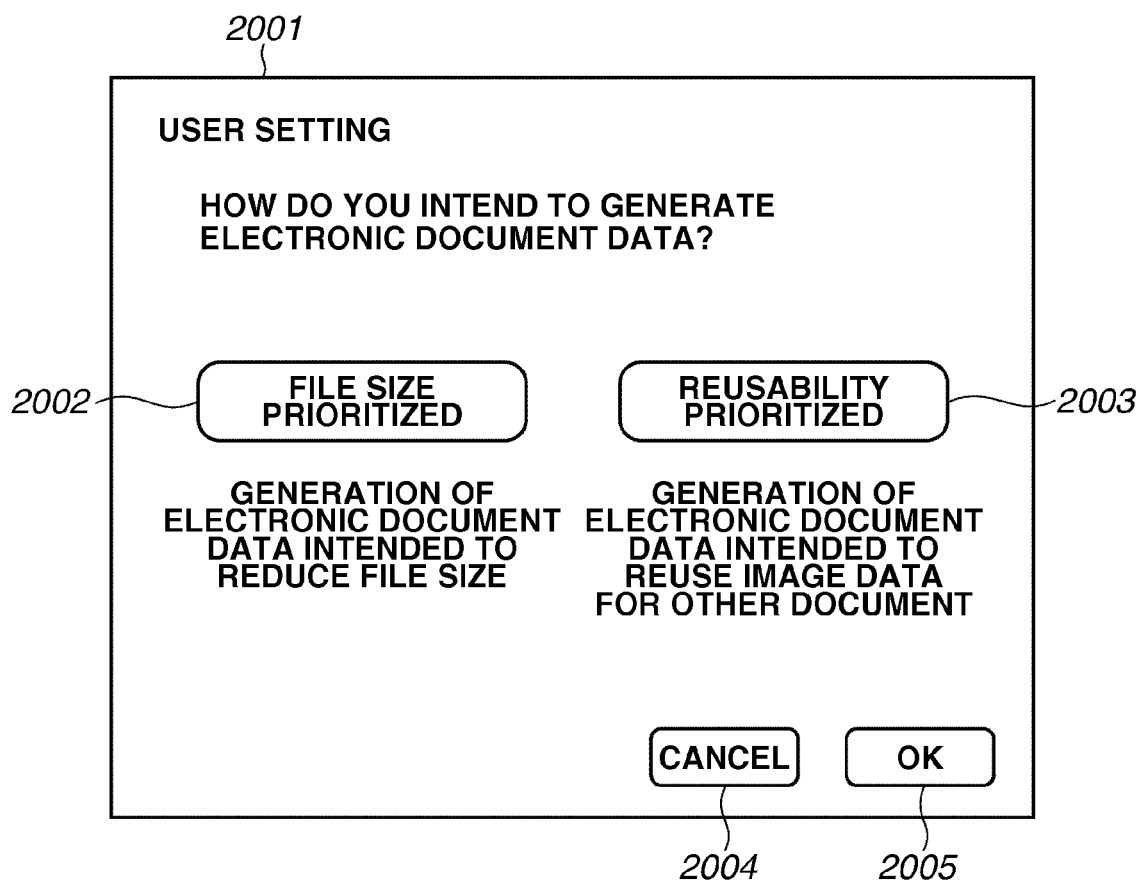
FIG. 20 illustrates an example of a UI screen that relates to the intent of generating electronic document data according to the second embodiment of the present invention.

FIG. 20 illustrates an example of the user interface (UI) screen that enables users to input an intent to generate the electronic document data displayed on the operation unit 203 illustrated in FIG. 2, which is provided in the MFP 100 illustrated in FIG. 1. An UI screen 2001 illustrated in FIG. 20 includes a file size prioritized button 2002 that can be pressed to reduce the file size of the electronic document data and a reusability prioritized button 2003 that can be pressed to reuse the "picture" and "line drawing" objects for other document. The UI screen 2001 further includes a cancel button 2004 that can be pressed to cancel the selected contents and an OK button 2005 that can be pressed to fix the selected contents.

In the present embodiment, the purpose of using the electronic document data can be switched according to a user's operation on the UI screen 2001. However, the system can be configured to automatically switch the mode according to the number of "picture" objects or "line drawing" objects in a document or in a page or according to their sizes or the number of pages.

If it is determined that the selected mode is the "file size prioritized" mode (YES in step S1901), the processing proceeds to step S1902. In step S1902, the data processing unit 218 performs processing similar to that described in the flowchart illustrated in FIG. 13 to generate electronic document data.

On the other hand, if it is determined that the selected mode is the "reusability prioritized" mode (NO in step S1901), the processing proceeds to step S1301 illustrated in FIG. 19 in which the data processing unit 218 performs processing according to the settings defined in the correspondence table illustrated in FIG. 8D. Processing to be performed in steps S1301 to S1305 of FIG. 19 are similar to the processing having been described with reference to the flowchart illustrated in FIG. 13. Therefore, detailed descriptions for these steps are not repeated.

If it is determined that the attribute of the selected processing target area is "picture", "line drawing", or "table" (NO in step S1303 in FIG. 19), then in step S1903, the image segmentation processing unit 503 and the vector conversion processing unit 502 illustrated in FIG. 5 perform graphics descriptions according to the settings defined in the correspondence table illustrated in FIG. 8D. More specifically, the image segmentation processing unit 503 and the vector conversion processing unit 502 cooperatively generate image segmentation based image parts descriptions for the "picture" objects and generate vector conversion based vector path descriptions for the "line drawing" and "table" objects.

Subsequently, in step S1904, the format conversion control unit 505 illustrated in FIG. 5 performs deletion processing for marking out the pixel information that corresponds to the "picture", "line drawing", and "table" objects on the image data 300 with the color of peripheral pixels according to the deletion processing instruction illustrated in FIG. 8D.

In step S1306, the format conversion control unit 505 determines whether there is a caption identifier attached to the processing target area. If it is determined that the caption identifier attached to the processing target area is present (YES in step S1306), the processing proceeds to step S1905. If it is determined that no caption identifier is attached to the processing target area (NO in step S1306), the processing proceeds to step S1308.

In step S1905, the format conversion control unit 505 determines whether the attribute of the selected processing target area is "picture." If it is determined that the attribute of the selected processing target area is "picture" (YES in step S1905), the processing proceeds to step S1308 to perform the processing for adding a caption identifier to the area object itself. On the other hand, if it is determined that the attribute of the selected processing target area is "line drawing" or "table" (NO in step S1905), the processing proceeds to step S1307 to perform the processing for generating a transparent vector path description corresponding to the target object. Processing to be performed in steps S1307 to S1313 of FIG. 19 are similar to the processing having been described with reference to the flowchart illustrated in FIG. 13. Therefore, detailed descriptions for these steps are not repeated.

As described above, the second embodiment can generate an appropriately described electronic document according to the purpose of use. Further, the second embodiment uses the transparent vector path description to generate electronic document data suitable for a highlight expression easy for users to recognize in the search without depending on the shape or the data state of the search target object.

The above-described first embodiment describes a transparent frame to be drawn in an object area based on the position/size of the object area or information obtainable through the image processing applied to the object (e.g., edge information). A third embodiment of the present invention provides a system that enables users to freely set the shape and the line width of the transparent frame to be drawn.

Figure 21:
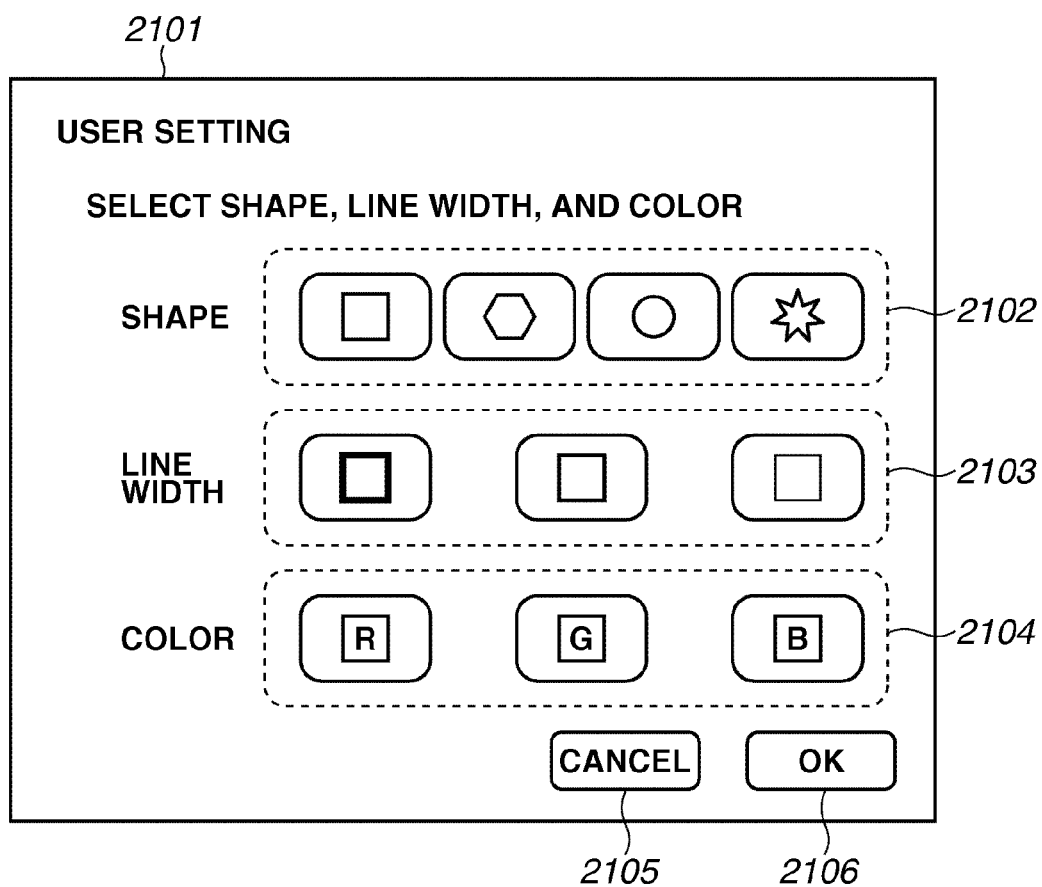
FIG. 21 illustrates an example of a UI screen that relates to transparent frame descriptions according to a third embodiment of the present invention.

FIG. 21 illustrates an example of the user interface (UI) screen that can be displayed on the operation unit 203, which is provided in the MFP 100. A UI screen 2101 includes a button 2102 that can be operated to select a basic shape of the transparent frame, a button 2103 that can be operated to select a line width, and a button 2104 that can be operated to select a highlight color.

If a user selects a description method for a transparent frame by operating the selection buttons 2102 to 2104 of the UI screen 2101 and then presses an OK button 2106, a control unit (not illustrated) provided in the data processing unit 218 transmits information relating to the transparent frame description designated by the user via the UI screen 2101 to the format converting unit 305.

If a cancel button 2105 is pressed to cancel the user settings, the control unit transmits default setting information to the format converting unit 305. The format converting unit 305 performs vector description for the transparent frame, based on the received information, in step S1307. In this case, to surely identify the object, it is desired to change the size of the selected basic shape according to the size of the object.

The settings for the transparent frame description are not limited to the above-described settings. For example, the settings may define the size and the line type (e.g., solid line, dotted line, and double line). Further, if a display unit 116 is a touch panel type, a shape drawn by a user on the display unit 116 can be converted into vector path description data so that a transparent frame having an arbitrary shape can be described.

In the above-described first embodiment, the metadata processing unit 304 extracts a metadata character string that corresponds to an object guide or a keyword, as an example of object area related metadata, from character information of the caption and the body output from the character recognizing unit 303.

However, the metadata extraction method is not limited to the above-described method. For example, the metadata processing unit 304 can extract an object area related metadata obtained from an image recognition result of the object area. In the context of the present disclosure, the "image recognition" is referred to as an image recognition technique, such as "face recognition" and "personal name recognition", which is conventionally known. For example, in a case where the object area subjected to the image recognition is a picture of a person, the metadata processing unit 304 can extract a personal name as an object area related metadata.

Figure 22:
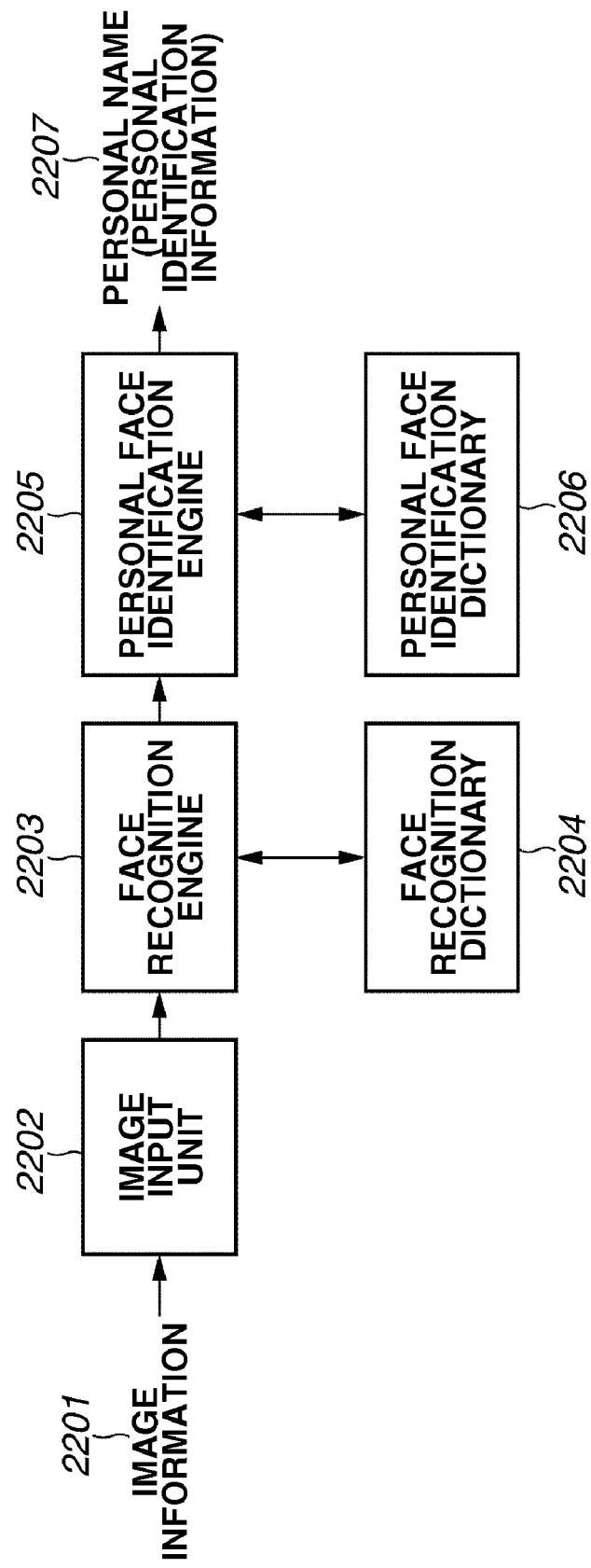
FIG. 22 is a block diagram illustrating an example configuration for face recognition processing according to a fourth embodiment of the present invention.

FIG. 22 illustrates an example of a face recognition method for recognizing the person in the above-described picture, as an example of a general image recognition method. In the present embodiment, the configuration illustrated in FIG. 22 can be used to extract a personal name as a metadata based on the face recognition technique. The following processing is calculation processing to be realized by the CPU 205.

In this case, when image information 2201 is obtained from a picture image as described above in the first embodiment, an image input unit 2202 changes the size and the resolution of an input image so that a face recognition engine 2203 and a personal face identification engine 2205 can process the input image. The image input unit 2202 sends the processed image to the face recognition engine 2203.

The face recognition engine 2203 performs processing for identifying a face area referring to a face recognition dictionary 2204. The face recognition dictionary 2204 can be prepared beforehand and stored in the ROM 210 or the storage unit 211 illustrated in FIG. 2. Further, if necessary, the face recognition dictionary 2204 can be copied to the RAM 206 so that the CPU 205 can speedily access the face recognition dictionary 2204.

To prepare the face recognition dictionary 2204, it is desired to collect numerous images including human faces and causes a learning machine (e.g., Support Vector Machine) to perform a supervised learning to obtain correct face area determination information as supervisory information, for example, according to the Back Propagation method.

If the CPU 205 illustrated in FIG. 2 determines that there is a face area, the face recognition engine 2203 generates, as face area information, coordinate values that represent an upper left point and a lower right point of a face area in the image. If it is determined that there are a plurality of face areas, the face recognition engine 2203 generates a plurality pieces of face area information correspondingly. Then, the face recognition engine 2203 sends the face area information together with the input image received from the image input unit 2202 to the personal face identification engine 2205.

The personal face identification engine 2205 performs machine learning processing for identifying a person referring to a personal face identification dictionary 2206 prepared beforehand. The personal face identification dictionary 2206 can be obtained by extracting face feature quantity information (e.g., eyes-and-nose distance relative to the entire face area) from image information of a face to be identified and associating the face to be identified with a personal name as supervisory information.

The personal face identification engine 2205 causes the CPU 205 illustrated in FIG. 2 to cut a face area indicated by the face recognition engine 2203 from the image generated from the image input unit 2202. The personal face identification engine 2205 extracts a face feature quantity as a face image. Then, if the personal face identification dictionary 2206 stores a candidate that holds a similar face feature quantity, the personal face identification engine 2205 outputs a personal name of the face that holds the similar face feature quantity.

If there are a plurality of face areas generated from the face recognition engine 2203, the personal face identification engine 2205 performs the above-described processing for each face area. The face recognition engine 2203 associates the personal name of the face with the face area information and outputs a personal name (i.e., personal identification information) 2207.

The personal face identification dictionary 2206 can be prepared beforehand and stored in the storage unit 211 illustrated in FIG. 2. Further, if necessary, the personal face identification dictionary 2206 can be copied to the RAM 206 so that the CPU 205 can speedily access the personal face identification dictionary 2206. As described above, a face area in a picture and personal name information of the face can be obtained using the face recognition technique.

Figure 23:
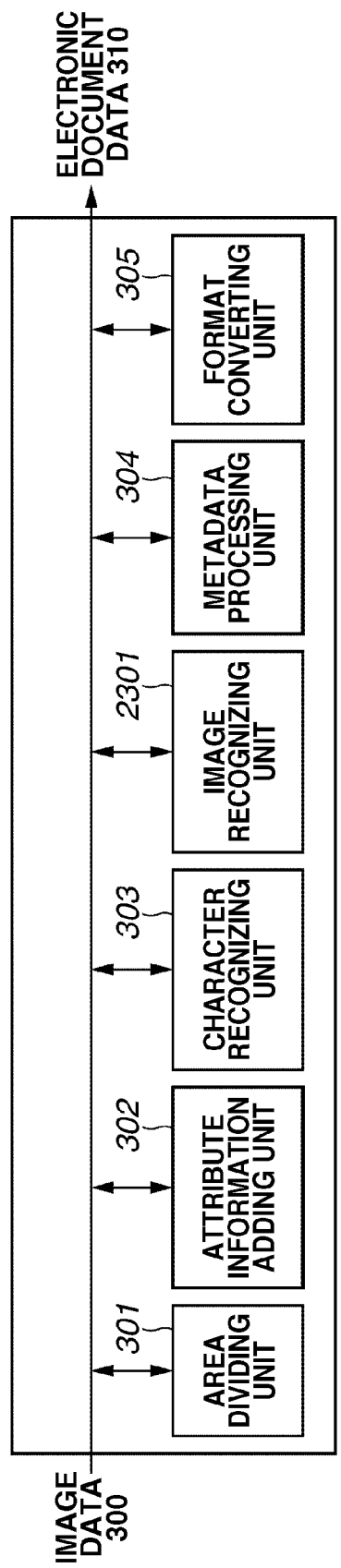
FIG. 23 is a block diagram illustrating an example configuration of the data processing unit 218 illustrated in FIG. 2 according to the fourth embodiment of the present invention.

FIG. 23 illustrates an example configuration that includes an image recognizing unit capable of realizing the face recognition illustrated in FIG. 22 according to the present embodiment. A block diagram illustrated in FIG. 23 is similar to that illustrated in FIG. 3. In FIG. 23, functional units similar to those illustrated in FIG. 3 are denoted by the same reference numerals and their descriptions are not repeated.

In FIG. 23, an image recognizing unit 2301 can realize the face recognition illustrated in FIG. 22. Accordingly, the image recognizing unit 2301 brings an effect of enabling the system to use information of a person in a picture as a metadata.

Especially, the transparent frame can be applied not only to the entire image (e.g., a picture) but also to a face portion of a person in the image. Further, a transparent frame having an arbitrary shape that suits the outline of the face can be described. Accordingly, metadata can be added to a limited region, such as a face area, in the picture. As described above in the first embodiment, the picture portion is handled as one image in many cases. Therefore, if the transparent frame is applied to a face portion of a person in an image and a corresponding personal name is added as a metadata, another picture that includes the same person can be detected based on the personal name. And, the face area of the person in another picture can be indicated.

Figure 24:
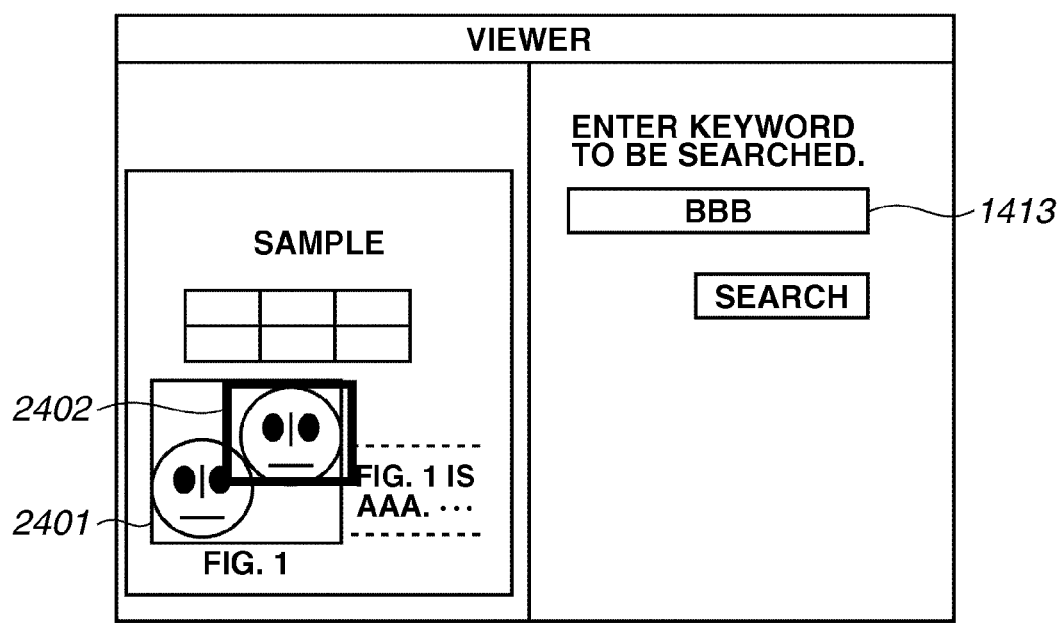
FIG. 24 illustrates an example of a display provided by an application that enables users to browse and search electronic document data according to the fourth embodiment of the present invention.

FIG. 24 illustrates an example of a result that can be obtained by executing the above-described search. As illustrated in FIG. 24, a word "BBB" to be searched is designated in an input portion 1413, which is similar to the portion illustrated in FIG. 14D. In this case, if a character string "BBB" (more specifically, the personal name obtained in the face recognition) that serves as a metadata is added to a face area portion 2402 in a picture 2401, the word to be searched coincides with it in the same manner as described with reference to FIG. 14D.

Accordingly, the application performs an operation to be performed when the searched word is hit. More specifically, similar to the above-described description, the application detects a graphics description having an attached value that is the same as the caption identifier of the coincided metadata. Then, the application performs a highlight display for the hit portion in the page display.

In this case, the target to be highlighted is the transparent frame vector path description to which the caption identifier 1808 is added (i.e., the description along the outer periphery of the face area 2402). The application draws the frame with a highlight color (e.g., a red color) instead of using the transparent color designated beforehand. Accordingly, the application can realize a useful page display that includes the display of a highlighted frame that surrounds the object portion 2402 having been hit in the search.

As described above, the present embodiment enables the system to search a specific portion (e.g., a limited portion included in a picture area) in a document image. Further, even in a case where a picture area is merged into a background image according to the settings defined in the correspondence table illustrated in FIG. 8C, the present embodiment can perform a highlight display for a specific portion in the picture area.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to the above-described embodiments, it is to be understood that the present invention is not limited to the disclosed embodiments. The scope of the following claims is to be accorded the broadest interpretation so as to encompass all modifications, equivalent structures, and functions.

This application claims priority from Japanese Patent Application No. 2009-046214 filed Feb. 27, 2009, which is hereby incorporated by reference herein in its entirety.

What is claimed is:

1. An image processing apparatus, comprising:
   an area dividing unit configured to extract an object area from an input image;
   a determination unit configured to determine an attribute of the object area extracted by the area dividing unit;
   a metadata processing unit configured to acquire a metadata to be associated with the object area extracted by the area dividing unit;
   a graphics description generating unit configured to generate a transparent graphics description for an object area having an attribute that requires generation of the transparent graphics description; and
   an electronic document generation unit configured to associate the transparent graphics description generated by the graphics description generating unit with the metadata and generate an electronic document that includes image data generated based on the input image and the transparent graphics description associated with the metadata.

2. The image processing apparatus according to claim 1, wherein the metadata processing unit is configured to acquire a metadata to be associated with an object area accompanied with an object area having a caption attribute based on a character recognition result obtained from the object area having the caption attribute.

3. The image processing apparatus according to claim 2, wherein the metadata processing unit is configured to acquire the metadata to be associated with the object area accompanied with the object area having the caption attribute based on the character recognition result obtained from the object area having the caption attribute and a character recognition result obtained from an object area having a body attribute.

4. The image processing apparatus according to claim 1, wherein the electronic document generation unit is configured to use an identifier that can associate the transparent graphics description with the metadata.

5. The image processing apparatus according to claim 1, wherein the attribute that requires generation of the transparent graphics description is an attribute other than characters.

6. The image processing apparatus according to claim 1, wherein the attribute that requires generation of the transparent graphics description is an attribute selected based on a user's designation from attributes other than characters.

7. The image processing apparatus according to claim 1, wherein the image data generated based on the input image includes image data of a background image into which the object area is merged.

8. The image processing apparatus according to claim 1, wherein the image data generated based on the input image includes image parts data of the object area or vector converted data.

9. The image processing apparatus according to claim 1, further comprising:
   a setting unit configured to set an attribute that generates the transparent graphics description according to a purpose of use of the electronic document to be generated.

10. The image processing apparatus according to claim 9, further comprising a display unit configured to display a user interface that enables a user to select a purpose of use of the electronic document to be generated.

11. The image processing apparatus according to claim 1, wherein the transparent graphics description is described by a frame that surrounds the object area.

12. The image processing apparatus according to claim 1, wherein the transparent graphics description is described by a predetermined shape of graphics.

13. The image processing apparatus according to claim 1, wherein the transparent graphics description is described by the shape of graphics according to a user's instruction.

14. The image processing apparatus according to claim 13, further comprising:
   a display unit configured to display a user interface that enables a user to select at least one of shape, line width, and highlight color of the graphics of the transparent graphics description.

15. The image processing apparatus according to claim 1, wherein the metadata processing unit is configured to acquire the metadata based on image recognition processing performed on the object area.

16. An image processing method, comprising:
- extracting an object area from an input image using an area dividing unit;
- determining an attribute of the object area extracted by the area dividing unit, using a determination unit;
- acquiring a metadata to be associated with the object area extracted by the area dividing unit, using a metadata processing unit;
- generating a transparent graphics description for an object area having an attribute that requires generation of the transparent graphics description, using a graphics description generating unit; and
- associating the transparent graphics description generated by the graphics description generating unit with the metadata, and generating an electronic document that includes image data generated based on the input image and the transparent graphics description associated with the metadata, using an electronic document generation unit.

17. A non-transitory computer-readable storage medium storing a computer program that causes a computer to function as:
- an area dividing unit configured to extract an object area from an input image;
- a determination unit configured to determine an attribute of the object area obtained by the area dividing unit;
- a metadata processing unit configured to acquire a metadata to be associated with the object area obtained by the area dividing unit;
- a graphics description generating unit configured to generate a transparent graphics description for an object area having an attribute that requires generation of the transparent graphics description; and
- an electronic document generation unit configured to associate the transparent graphics description generated by the graphics description generating unit with the metadata and generate an electronic document that includes image data generated based on the input image and the transparent graphics description associated with the metadata.

* * * * *